(12) United States Patent
Puri et al.

(10) Patent No.: US 11,798,582 B2
(45) Date of Patent: Oct. 24, 2023

(54) HEAT-ASSISTED MAGNETIC RECORDING HEAD NEAR-FIELD TRANSDUCER WITH A THERMALLY-STABILIZED PLASMONIC ALLOY

(71) Applicant: Seagate Technology LLC, Fremont, CA (US)

(72) Inventors: Anil Kumar Puri, Londonderry (GB); Venancio Calero Vila, Ely (GB); Evangelos Atmatzakis, Londonderry (GB); Aji Baby, Londonderry (GB); Paula Frances McElhinney, Londonderry (GB); Beverley Rutherford McConnell, Londonderry (GB); Marcus Benedict Mooney, Quigleys Point (IE); Mark Gubbins, Letterkenny (IE)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/657,398

(22) Filed: Mar. 31, 2022

(65) Prior Publication Data

US 2022/0319542 A1 Oct. 6, 2022

Related U.S. Application Data

(60) Provisional application No. 63/169,109, filed on Mar. 31, 2021.

(51) Int. Cl.
| | | |
|---|---|---|
| G11B 5/00 | (2006.01) | |
| G11B 5/31 | (2006.01) | |
| G11B 13/08 | (2006.01) | |
| C22C 19/03 | (2006.01) | |
| C22C 5/02 | (2006.01) | |
| C22C 5/06 | (2006.01) | |
| C22C 21/00 | (2006.01) | |
| C22C 27/00 | (2006.01) | |
| G11B 5/60 | (2006.01) | |

(52) U.S. Cl.
CPC ............... *G11B 5/314* (2013.01); *C22C 5/02* (2013.01); *C22C 5/06* (2013.01); *C22C 19/03* (2013.01); *C22C 21/00* (2013.01); *C22C 27/00* (2013.01); *G11B 5/3106* (2013.01); *G11B 5/6088* (2013.01); *G11B 13/08* (2013.01); *G11B 2005/0021* (2013.01)

(58) Field of Classification Search
CPC . G11B 2005/0021; G11B 5/314; G11B 13/08; G11B 5/3306; G11B 5/00
USPC .......................................................... 360/59
See application file for complete search history.

(56) References Cited

U.S. PATENT DOCUMENTS

| | | | |
|---|---|---|---|
| 8,578,593 B2 | 11/2013 | Tanaka et al. | |
| 9,202,481 B1 | 12/2015 | Matsumoto et al. | |
| 9,732,401 B2 | 8/2017 | Maekawa et al. | |
| 10,403,315 B2 | 9/2019 | Matsumoto et al. | |
| 10,482,914 B2 | 11/2019 | Cheng et al. | |
| 2015/0170683 A1 | 6/2015 | Balamane et al. | |
| 2016/0351210 A1 | 12/2016 | Blaber et al. | |
| 2019/0198053 A1* | 6/2019 | Krichevsky | G11B 5/127 |

* cited by examiner

*Primary Examiner* — Nabil Z Hindi

(57) ABSTRACT

A heat-assisted magnetic recording head comprises a near-field transducer (NFT). The NFT comprises a thermally-stabilized plasmonic alloy, wherein the thermally-stabilized plasmonic alloy comprises a plasmonic metal and at least one alloying metal.

17 Claims, 20 Drawing Sheets

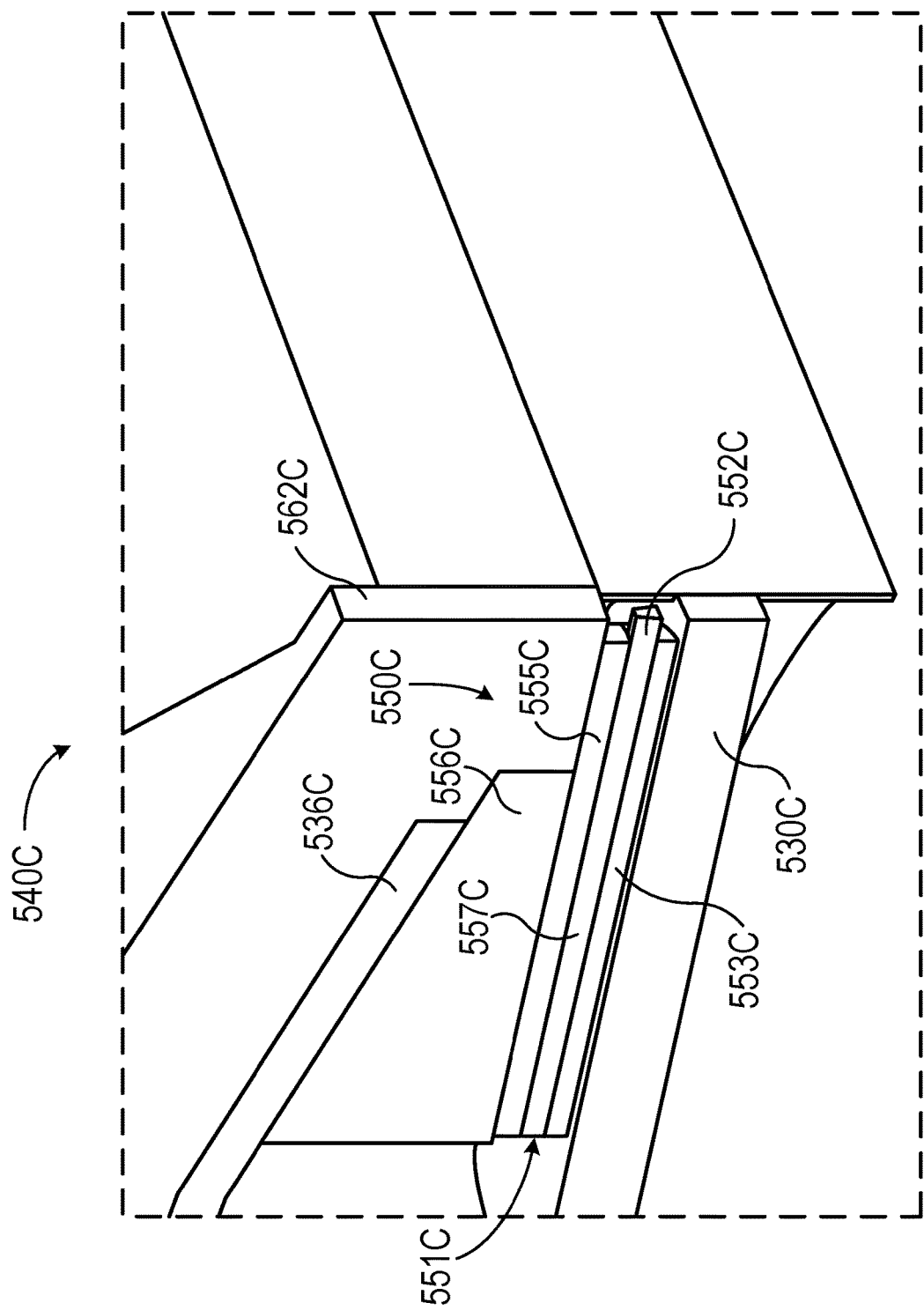

HEAT-ASSISTED MAGNETIC RECORDING HEAD NEAR-FIELD TRANSDUCER WITH A THERMALLY-STABILIZED PLASMONIC ALLOY

This application claims priority to U.S. Provisional Patent Application Ser. No. 63/169,109, entitled "HEAT-ASSISTED MAGNETIC RECORDING HEAD NEAR-FIELD TRANSDUCER WITH A THERMALLY-STABILIZED PLASMONIC ALLOY" and filed Mar. 31, 2021, the entire contents of which are hereby incorporated by reference.

TECHNICAL FIELD

The disclosure relates to a near-field transducer for a heat-assisted magnetic recording head of a hard disk drive.

BACKGROUND

Hard disk drives (HDDs) utilize one or more magnetic recording heads fabricated on sliders to write data to and read data from magnetic disks. Data is stored in an HDD in the form of oriented magnetic grains on surfaces of magnetic disks. A magnetic recording head of an HDD may include at least one writer and at least one reader. A writer is configured to generate and direct a magnetic field toward a surface of a magnetic disk to orient magnetic grains on the surface of the magnetic disk to form stored bits of data.

Magnetic recording physics imposes limits on aspects of the HDD recording system in the form of a superparamagnetic limit. Specifically, the superparamagnetic limit requires a balance of media grain size (volume) and grain magnetic anisotropy with thermal energy. A magnetic disk in which the thermal energy ($k_B T$, where $k_B$ is the Boltzmann constant and T is the temperature of the system) exceeds a threshold dependent on the product of the media grain size and the grain magnetic anisotropy may be unstable and susceptible to data loss from grain orientation flipping. Modern recording technology development seeks to increase areal density capability (ADC) by enabling smaller bits of thermally stable data to be recorded on magnetic disks. Generally, the use of smaller bits also requires smaller grains in order to maintain signal-to-noise ratio (SNR), and smaller grains in turn require higher magnetic anisotropy to maintain data stability against thermal fluctuations.

Heat-assisted magnetic recording (HAMR) is one approach to enabling smaller stable grains to be written. HAMR utilizes electromagnetic energy to heat an area of a high anisotropy magnetic disk and temporarily reduce the magnetic coercivity of grains of the magnetic disk during a write cycle, allowing these grains to more easily be preferably oriented by a field from a magnetic writer. Subsequently to writing the data, the area of the magnetic disk cools and the magnetic coercivity increases, effectively locking in the orientation of the grains and leaving them in a thermally stable state.

In addition to including one or more writers and readers, a heat-assisted magnetic recording head (hereafter HAMR head) may further include a light source (e.g., a laser), a light delivery system (e.g., an optical layer or layers such a waveguide and cladding layer(s)), and a near-field transducer (NFT). An NFT is configured to receive electromagnetic energy (i.e., photons or waves) from the light source by way of the light delivery system, excite localized surface plasmon (LSP) modes on a surface of the NFT, and focus near-field energy of the LSP distribution on a spot on a surface of a magnetic disk. Localized surface plasmons (LSPs) are generated on the NFT by coupling of the electromagnetic energy from the light delivery system with free electrons of the NFT. The LSP distribution may then condense and localize on an area or feature of the NFT, allowing the near-field of the LSP distribution to be focused on the surface of the magnetic disk. The conversion of incident propagating electromagnetic energy to an evanescent near-field distribution associated with LSPs allows the focused spot on the magnetic disk surface to be much smaller than the limit imposed by the diffraction limit of the associated light source wavelength (e.g., a spot size on the order of 50 nm or less can be achieved with incident electromagnetic waves with a wavelength of 830 nm). In some examples, the focused spot of LSP near-field energy on the surface of the magnetic disk heats the surface and temporarily reduces the coercivity of the magnetic grains of the magnetic disk, allowing a writer to preferably orient more grains of the magnetic disk than a magnetic recording head that does not include an NFT. High temperatures may be generated within regions and features of the HAMR head during the HAMR write operation as a result of scattering and other non-plasmonic loss of incident electromagnetic energy from the light source, as well as from thermal energy from the highly localized concentration of LSPs on the NFT.

Certain materials (e.g., gold, silver) are most suitable for generating LSPs from incident electromagnetic energy due to their material properties such as optical response coefficients (e.g., refractive index and extinction coefficient), electrical permittivity, and free electron density, and these materials are commonly used as plasmonic materials for fabricating features of a HAMR head (e.g., NFT features such as disks and pegs). However, ideal plasmonic materials may also be susceptible to various defect modes related to thermal instability in the presence of high temperatures generated during the HAMR write operation (e.g., feature recession, deformation, voiding, oxidation, and delamination). Example HAMR heads and their features may suffer from thermal and mechanical degradation from repeated exposure to these elevated temperatures, leading to performance, reliability, and lifetime concerns of the HAMR HDD.

SUMMARY

The present disclosure describes features of a heat-assisted magnetic recording (HAMR) head of a hard disk drive (HDD), the features comprising a thermally-stabilized plasmonic alloy. Example thermally-stabilized plasmonic alloys comprise a plasmonic metal (e.g., gold) and at least one alloying metal (e.g., nickel). In some examples, one or more features of a near-field transducer (NFT) of the HAMR head comprises a thermally-stabilized plasmonic alloy. For example, a disk, a peg, and/or a heat sink structure may comprise a thermally-stabilized plasmonic alloy. In some examples, other HAMR head features such as a miniature solid immersion mirror (mSIM) or optical side shield (OSS) comprise a thermally-stabilized plasmonic alloy. In some examples, a feature of a HAMR head which comprises a thermally-stabilized plasmonic alloy provides improved thermal stability and/or defect resistance as compared to a similar feature which does not comprise a thermally-stabilized plasmonic alloy. In contrast to example HAMR heads including features which do not comprise a thermally stabilized plasmonic alloy, a HAMR head that includes features which comprise a thermally-stabilized plasmonic alloy may demonstrate one or more of higher thermal stability, resistance to defect modes (e.g., feature recession, voiding, deformation, delamination), better reliability performance, or a longer lifetime.

In one example, a HAMR head comprises an NFT, wherein the NFT comprises a thermally-stabilized plasmonic alloy, and wherein the thermally-stabilized plasmonic alloy comprises a plasmonic metal and at least one alloying metal.

In another example, a method for making a thermally-stabilized plasmonic alloy feature of an NFT of a HAMR head comprises the steps of (a) providing a substrate to contain features of the heat-assisted magnetic recording head; (b) supporting the substrate in a deposition chamber; (c) providing, on the substrate, an exposed surface for deposition, wherein the exposed surface for deposition is a surface of a first feature of the heat-assisted magnetic recording head; (d) elevating a temperature of the substrate; and (e) depositing a plasmonic metal and an alloying metal directly onto the exposed surface for deposition to form the thermally-stabilized plasmonic alloy feature.

These and other features and aspects of various examples may be understood in view of the following detailed discussion and accompanying drawings.

BRIEF DESCRIPTION OF THE DRAWINGS

FIG. 5C is a perspective view of an example HAMR head, in accordance with aspects of this disclosure.

DETAILED DESCRIPTION

Figure 1:
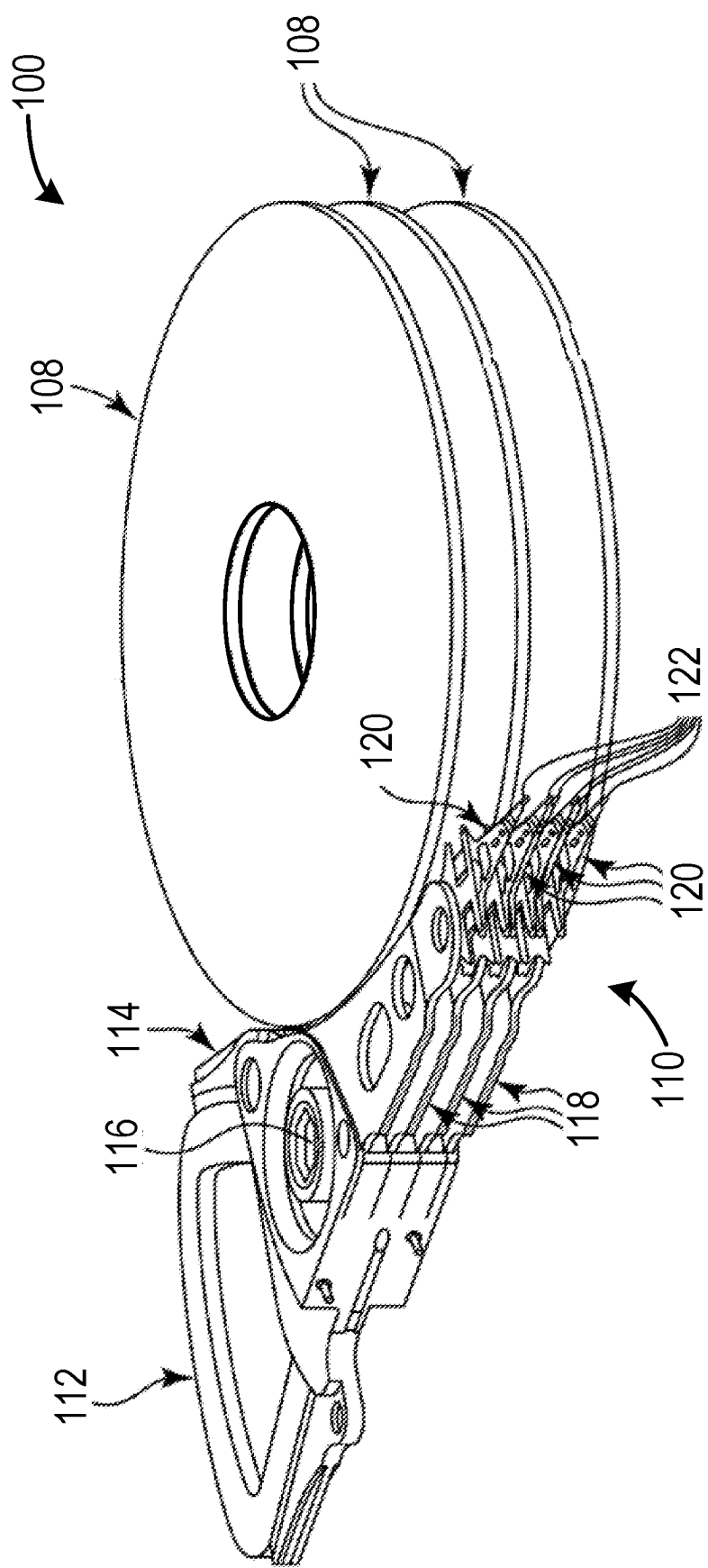
FIG. 1 is a perspective view of an example hard disk drive, in accordance with aspects of this disclosure.

FIG. 1 is a perspective view of an example heat-assisted magnetic recording (HAMR) hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a slider 122. Each slider 122 includes a heat-assisted magnetic recording (HAMR) head (not shown in FIG. 1).

HSA 110 of FIG. 1 includes a voice coil drive actuator 112. Voice coil drive actuator 112 produces a magnetic field which exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus sliders 122, to move relative to magnetic disks 108.

Each HAMR head of sliders 122 includes a plurality of active components that are configured to perform or assist in performing drive operations (e.g., read operations, write operations, heating operations). Examples of active components include a writer, a reader, a heater (e.g., a read heater or a write heater), and a near-field transducer (NFT). A drive controller or other suitable control circuitry (not shown) of HDD 100 outputs control signals to direct the respective active components of HAMR heads of sliders 122. In some examples, the active components are configured to activate in response to receiving one or more control signals. In one example, a control signal includes data to be written to one of magnetic disks 108 by a writer of a HAMR head associated with one of sliders 122. In another example, a control signal applies a bias to a reader of a HAMR head associated with one of sliders 122. In another example, a control signal activates a heater of a HAMR head associated with one of sliders 122 prior to and/or during a drive operation. In another example, a control signal directs electromagnetic energy to be sent from a light source of a slider 122 to an NFT of a HAMR head of the slider 122.

Figure 2:
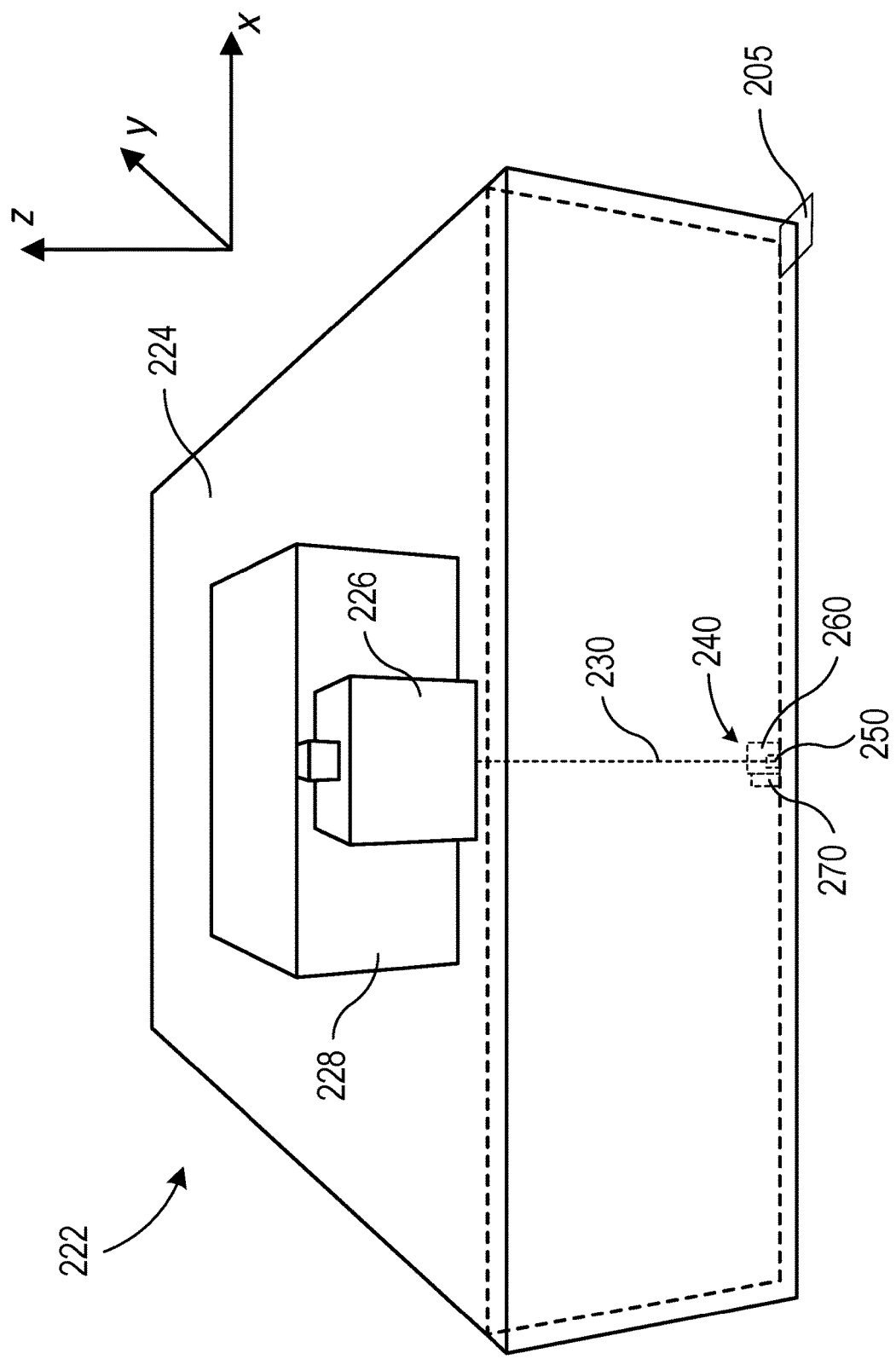
FIG. 2 is a perspective view of an example heat-assisted magnetic recording (HAMR) slider, in accordance with aspects of this disclosure.

FIG. 2 is a perspective view of an example HAMR slider 222 (e.g., a slider 122 of HDD 100 of FIG. 1), in accordance with aspects of this disclosure. Slider 222 includes a slider body 224, a laser 226, a submount 228, a waveguide 230, and a HAMR head 240. HAMR head 240 includes a near-field transducer (NFT) 250, writer(s) 260, and reader(s) 270. In the example of FIG. 2, some features or parts of features of NFT 250, writer(s) 260, and reader(s) 270 (e.g., features such as a peg of NFT 250, a write pole of writer 260, a free layer and/or a pinned layer of reader 270), are presented on a media-facing air-bearing surface (ABS) 205 that is positioned over a surface of a magnetic disk (not shown) during some operations of the HDD. During such operations, ABS 205 faces and is held proximal to the moving magnetic disk surface by a cushion of gas, known as an active air bearing (AAB), that is produced from a dynamic flow of gas across a pattern of recessed sub-surfaces bound within the volume of slider body 224 by ABS 205.

Laser 226 is configured to emit photons of an approximate target wavelength. In some examples, laser 226 emits photons with an approximate wavelength in the near infrared range or visible range. In one example, laser 226 emits photons with an approximate target wavelength of 830 nm, qualifying laser 226 as a near infrared (NIR) source. Examples of laser 226 include an optically pumped semiconductor laser, a quantum well laser, and an integrated laser. Laser 226 of this example may be configured as an edge emitting laser (EEL), vertical cavity surface emitting laser (VCSEL), or other type of laser diode. Other example HAMR heads may include other types of light sources such as light emitting diodes (LEDs) and surface emitting diodes.

Laser 226 is coupled to slider body 224 via submount 228. In the example of FIG. 2, laser 226 and submount 228 are located on a face of slider body 224 which is opposite to ABS 205. In other example HAMR sliders, a laser may be directly mounted to the slider body. In some example HAMR sliders, a laser may be integrated into a slider body (e.g., on-wafer laser). Submount 228 may be configured to redirect photon output from laser 226 so that it is directed into waveguide 230 in the negative z-direction of FIG. 2. The path between laser 226 and waveguide 230 may include one or more optical couplers, mode converters, and/or mode couplers. Waveguide 230 is formed integrally within slider body 224 and is configured to deliver photons from laser 226 to NFT 250.

NFT 250 is configured to generate and support a distribution of localized surface plasmons (LSPs) upon receiving incident photons from laser 226 by way of waveguide 230, condense the LSP distribution on an area or feature of NFT 250, and focus near-field energy of the LSP distribution on a spot on a surface of a magnetic disk (e.g., a magnetic disk 108 of FIG. 1). Writer 260 is configured to generate a magnetic field from an electrical current and aim the magnetic field at an area of the magnetic disk which includes the spot of focused near-field energy of the LSP distribution of NFT 250. The near-field energy of the LSP distribution heats and lowers the coercivity of the magnetic grains in the spot of focus, thereby enabling these magnetic grains to be preferentially oriented by the magnetic field of writer 260. Turning off laser 226 or moving NFT 250 toward a different location of the magnetic disk (or moving the magnetic disk such that NFT 250 faces a different location of the magnetic disk) removes the focused near-field energy from the spot on the magnetic disk, allowing the magnetic grains to cool and thereby locking in the preferred grain orientation, and thus bits of written data, induced by the magnetic field from writer 260. These steps of applying focused near-field energy to a surface of a magnetic disk, applying a magnetic field which is at least partially coincident with the near-field energy on the surface of the magnetic disk, ceasing the near-field energy and applied magnetic field, and cooling the surface of the magnetic disk describe, at a high level, the HAMR write operation.

A HAMR write operation, and more specifically the process of generating and sustaining LSPs on an NFT, may be accompanied by a temperature increase in the HAMR head performing the write operation and its associated features. A temperature increase in a HAMR head and/or one or more of its features may result from incident photons from a laser or other source which are not converted into LSPs and are lost through thermal excitation, scattering, and/or other non-resonant modes. Incident photon energy losses may reduce the efficiency of LSP generation and increase the laser power which is required to maintain the LSP distribution needed to heat a magnetic disk surface and lower the magnetic coercivity of the associated grains. Such an increase in laser power may increase the temperature of a HAMR head and/or one or more of its respective features.

In some scenarios, a concentrated near-field distribution of LSPs on an NFT which is generated during a write operation of a HAMR head may increase the temperature of a HAMR head and/or one or more of its respective features. In some instances, heat is generated by non-radiative decay of LSPs. For example, an LSP may decay and generate hot electrons (i.e., free electrons which acquire high kinetic energy). Hot electrons, in some instances, scatter and decay non-radiatively, generating heat in a HAMR head. In some scenarios, a hot electron is scattered by another electron and generates additional modes which are accompanied by non-radiative decay. In other instances, a hot electron may scatter another electron and/or an LSP. In some example NFTs, electron scattering may reduce the efficiency of LSP generation and increase the operating temperature of a HAMR head and/or one or more of its respective features.

Example HAMR head features (e.g., NFTs, NFT features such as pegs and disks, heat sink structures, miniature solid immersion mirrors) may comprise plasmonic metals. As used herein, a plasmonic metal is a metal which possesses properties (e.g., electrical properties, optical properties) which promote resonance coupling between photons incident upon the plasmonic metal and free electrons of the plasmonic metal. Such resonant coupling of a photon with free electrons of the plasmonic metal may excite one or more plasmonic modes of the plasmonic metal, which may result in the generation of an LSP on a surface of the plasmonic metal. Examples of plasmonic metals include gold, silver, ruthenium, copper, aluminum, rhodium, and combinations thereof.

The efficiency of LSP generation and maintenance in a plasmonic metal may be characterized by a plasmonic figure of merit, with preferred plasmonic metals for a particular application demonstrating high plasmonic figures of merit in response to photons within a wavelength range defined by the application. In the case of a HAMR head, such as HAMR head 240 of FIG. 2, a plasmonic feature (i.e., a feature comprising a plasmonic metal, such as NFT 250) may be coupled to an optical feature, such as waveguide 230, which is configured to direct photons toward a surface of the plasmonic feature in order to promote LSP generation on the plasmonic feature. The plasmonic metal in NFT 250 may be selected based on having a high plasmonic figure of merit in response to photons in a wavelength range of a light source of the slider, such as laser 226 of slider 222 of FIG. 2.

Common plasmonic metals which demonstrate high plasmonic figures of merit (e.g., gold) may be prone to thermal defects, instability, and degradation at temperatures which are encountered by the HAMR head under normal operating conditions. Such repeated and prolonged thermal exposure may lead to thermal degradation, physical defects, deformation, and/or recession of features which may reduce the performance and/or shorten the lifetime of a HAMR head. In some examples, features of a HAMR head may develop defects associated with changes in grain structure, grain boundaries, and/or microstructure of a constituent plasmonic metal. Example defects include grain boundary migration, interface degradation, delamination, voiding, feature separation, and other thermally induced defect modes. In some instances, such defects lead to increased operating temperatures of a HAMR head and/or one or more of its respective features, which may further increase and accelerate thermal defect creation and propagation. In other scenarios, the increased presence of defects in the plasmonic metal of a HAMR head feature such as an NFT may impact the plasmonic figure of merit and lead to increased laser power required to maintain the LSP density needed for HDD operation. Such increase in laser power may increase the operating temperature of the HAMR head and thus accelerate defect formation and migration.

In view of the foregoing, it is desirable to construct a feature of a HAMR head with a material or combination of materials which can promote the generation of an LSP distribution through resonant plasmonic mode coupling with incident photons from a source, can sustain the distribution of LSPs, and can endure repeated and/or extended thermal exposure without experiencing substantial thermal degradation which compromises the performance and lifetime of the HAMR head. In accordance with examples of this disclosure, an example HAMR head, such as HAMR head 240 of FIG. 2, includes a feature comprising a thermally-stabilized plasmonic alloy, wherein the thermally-stabilized plasmonic alloy comprises a plasmonic metal and at least one alloying metal.

In some examples, a HAMR head comprises an NFT, wherein the NFT comprises a thermally-stabilized plasmonic alloy comprising a plasmonic metal and at least one alloying metal. In some scenarios, the inclusion of a thermally-stabilized plasmonic alloy in a feature of a HAMR head may provide thermal benefits (e.g., grain stability, resistance to defect migration, resistance to deformation) over a comparable feature which does not include a thermally-stabilized plasmonic alloy. In other words, an NFT, a feature of an NFT (e.g., a peg or a disk), or another feature of a HAMR head which includes a thermally-stabilized plasmonic alloy may demonstrate advantages over a comparable feature which does not include a thermally-stabilized plasmonic alloy. In addition to features of an NFT, it is contemplated that other features of a HAMR head may comprise thermally-stabilized plasmonic alloys, including heat sink structures, side shields (e.g., optical side shields), miniature solid immersion mirrors, and bottom clad reflectors.

An example thermally-stabilized plasmonic alloy includes a plasmonic metal (e.g., gold), which may be selected based on having a high plasmonic figure of merit, and an alloying metal. Example alloying metals include nickel (Ni), bismuth (Bi), indium (In), tin (Sn), manganese (Mn), holmium (Ho), lutetium (Lu), praseodymium (Pr), scandium (Sc), uranium (U), barium (Ba), cesium (Cs), dysprosium (Dy), europium (Eu), rubidium (Rb), terbium (Tb), gadolinium (Gd), samarium (Sm), thallium (Tl), cadmium (Cd), neodymium (Nd), lead (Pb), hafnium (Hf), niobium (Nb), erbium (Er), zinc (Zn), magnesium (Mg), palladium (Pd), vanadium (V), chromium (Cr), iron (Fe), lithium (Li), platinum (Pt), sodium (Na), strontium (Sr), calcium (Ca), yttrium (Y), thorium (Th), beryllium (Be), thulium (Tm), erbium (Er), ytterbium (Yb), promethium (Pm), neodymium (Nd), cobalt (Co), cerium (Ce), lanthanum (La), praseodymium (Pr), or combinations thereof. In one example of the present disclosure, the alloying metal comprises nickel.

The alloying metal in a thermally-stabilized plasmonic alloy may stabilize grain structure, slow grain growth, and/or impede defect and/or grain boundary migration in the plasmonic metal when a feature comprising the thermally-stabilized plasmonic alloy is subjected to thermal stress (e.g., heat generated during the HAMR write process). An alloying metal atom in the bulk of a plasmonic metal grain, for example, may drive the formation of an atom cluster which may pin defects and slow defect migration. Alloying metal atoms at a plasmonic metal grain boundary may slow movement of the grain boundary by increasing the drag force on the grain boundary through the binding potential and elastic strain interaction of the alloying metal atom with the grain boundary. In some instances, a plasmonic metal may diffuse from a first feature of a HAMR head to a second feature of the HAMR head under thermal stress, and the inclusion of an alloying metal in the first feature may help to stabilize the structure and reduce or prevent diffusion of the plasmonic metal from, and recession of, the first feature. An alloying metal atom in the bulk of a plasmonic metal grain may help to capture free atoms of the plasmonic metal to prevent thermal diffusion of the free plasmonic metal atoms, helping to slow or prevent feature deformation and recession. Alloying metal atoms at a grain boundary or surface of a plasmonic metal may, in some examples, capture free atoms of the plasmonic metal and prevent their diffusion along and across the grain boundary or surface, helping to slow or prevent grain boundary movement and growth. In other instances, the existence of alloying metal atoms at grain boundaries changes the grain boundary structure, potentially providing fewer sites for grain boundary diffusion and improved grain boundary cohesion and stability. In some instances, the alloying metal may improve the adhesion of a first feature comprising the thermally-stabilized plasmonic alloy to another feature of the HAMR head.

In some examples, the introduction of heat to the process of forming a thermally-stabilized plasmonic alloy (i.e., thermally stabilizing the plasmonic alloy) may impact the alloy formation process in a way that increases the thermal stability of the resultant alloy. For example, an alloying metal may not form a stable equilibrium phase with a plasmonic metal or may not be soluble in a plasmonic metal at room temperature. However, the alloying metal may form one or more stable phases with the plasmonic metal at an elevated temperature. Applying heat during the thermally-stabilized plasmonic alloy formation process may, in some instances, promote the formation and growth of grains of an alloy phase associated with the elevated temperature, and cooling after their formation is complete may leave these alloy grains in a metastable state; that is, the grains may not be in a thermodynamic equilibrium state at room temperature, but the rate of diffusion of the alloying metal in the plasmonic bulk is negligible and thus their structure is stable. Formation of the thermally-stabilized plasmonic alloy at the elevated temperature may enable more atoms of the alloying metal to reside in the grain bulk than in an alloy which is not formed at the elevated temperature, and the resultant grains may be more resistant to thermal defect formation and migration.

In some examples, the application of heat during the formation of the thermally-stabilized plasmonic alloy may also increase the rate of diffusion during formation, allowing the alloying metal atoms to move more rapidly to their energetically-preferred positions (i.e., in bulk interstitial sites, in bulk vacancy sites, along grain boundaries, in grain boundary defects or vacancies). The elevated temperature may allow more alloying metal atoms to be incorporated into favorable positions in the final grain structure and may provide more thermal benefit to the structure than an alloy which is not formed at the elevated temperature. Controlling the temperature of a process may, in some examples, allow the properties of the thermally-stabilized plasmonic alloy to be tuned (e.g., preferentially driving more alloying atoms to grain boundaries through diffusion, targeting a preferred bulk phase for metastable grains). In contrast to forming an alloy at room temperature, the application of heat during the formation (i.e., thermally stabilizing the plasmonic alloy) may allow more alloying metal atoms to be preferentially located in and/or around the plasmonic metal grains and may provide more thermal stability benefit to a feature formed of the thermally-stabilized plasmonic alloy.

An alloying metal in a thermally-stabilized plasmonic alloy may be selected based on its atomic size and lattice parameters relative to those of the plasmonic metal. The size of an alloying metal atom may affect its probability of stabilizing in the bulk of a grain or along a grain boundary. For example, an alloying metal atom with a radius similar to or smaller than the radius of a plasmonic metal atom may find an energetically-favorable state in a substitutional or interstitial position in the plasmonic metal bulk lattice. Some alloying metal atoms may fit into defect or vacancy sites along a grain boundary.

An alloying metal in a thermally-stabilized plasmonic alloy may be selected based on its solubility in the plasmonic metal of the thermally-stabilized plasmonic alloy. Alloying metal atoms with low solubility in the plasmonic metal, for example, may be thermodynamically driven to grain boundaries where they may stabilize the grain boundaries and reduce grain growth and grain boundary migration under thermal stress. Alloying metal atoms with high solubility in the plasmonic metal may find thermodynamically stable sites in the bulk of the plasmonic metal grains. Thermally stabilizing the thermally-stabilized plasmonic alloy through the application of heat during its formation may increase the rate of diffusion and drive more alloying metal atoms toward thermodynamically preferred sites in the resultant thermally-stabilized plasmonic alloy. An alloying metal may be selected based on its ability to form a preferred phase with a plasmonic metal at a temperature which is targeted in the process of forming the thermally-stabilized plasmonic alloy.

An alloying metal in a thermally-stabilized plasmonic alloy may be selected based on its binding energy with atoms of the plasmonic metal of the thermally-stabilized plasmonic alloy. For example, alloying metal atoms with a bond strength with the plasmonic metal atoms that is greater than the bond strength between plasmonic metal atoms may capture free atoms of the plasmonic metal in the grain bulk and along grain boundaries, reducing the presence of these free atoms, reducing their diffusion, and, in some instances, impeding defect formation and propagation. A strong binding energy between alloying metal atoms and plasmonic metal atoms in the grain bulk may also drive the formation of atom clusters which may pin defects and slow their migration. A similar effect may occur at grain boundaries, where strong binding of alloying metal atoms to grain surface sites may induce strain onto grain boundaries and slow their migration. In examples of a thermally-stabilized plasmonic alloy, the application of heat during the process may increase the binding of alloying metal atoms to energetically preferred and stable sites in the resultant alloy.

An alloying metal in a thermally-stabilized plasmonic alloy may be selected based on its optical properties and its impact on the optical properties on the resultant alloy. The efficiency of LSP generation (e.g., the plasmonic figure of merit) in an NFT such as NFT 250, for example, is dependent on the optical response of the plasmonic material (e.g., its refractive index n and extinction coefficient k) to incident photons from a light source (e.g., laser 226). Constructing an NFT which exhibits optical properties such as n and k values which are close to those of a pure plasmonic material may, in some cases, demonstrate a higher plasmonic figure of merit than an example NFT which exhibits n and k values which are different than the pure plasmonic material. In the example of a thermally-stabilized plasmonic alloy, the alloying metal atoms may change the optical response of the resultant alloy relative to the optical response of the pure plasmonic material. A direction of goodness for the selection of an alloying metal is one which can be dispersed in a plasmonic material at sufficient concentrations to improve thermal stability while maintaining optical response properties which are sufficient to support LSP generation in a plasmonic feature. The introduction of heat in the thermal stabilization process of forming the thermally-stabilized plasmonic alloy may, in some scenarios, enable more rapid and efficient placement of alloying metal atoms, thus requiring lower concentrations to achieve thermal benefits and reducing their impact on the optical properties of the resultant thermally-stabilized plasmonic alloy.

A concentration of an alloying metal in a thermally-stabilized plasmonic alloy may be defined by a percentage of the thermally-stabilized plasmonic alloy or of a feature of a HAMR head comprising the thermally-stabilized plasmonic alloy (e.g., NFT 250, a disk or a peg of NFT 250). For example, a feature of NFT 250 (e.g., a disk or a peg) or another feature of HAMR head 240) comprising a thermally-stabilized plasmonic alloy may include a concentration of an alloying metal which is defined by an atomic percentage of a total atomic composition of the feature that is occupied by the alloying metal. In other examples, a feature of NFT 250 or another feature of HAMR head 240 comprising a thermally-stabilized plasmonic alloy may include a concentration of an alloying metal which is defined by a weight percentage of a total atomic or molecular weight of the feature that is occupied by the alloying metal. In other examples, a portion of a feature of an NFT or a portion of another feature of a HAMR head comprises a thermally-stabilized plasmonic alloy (e.g., a top layer of an NFT, a media-facing portion of an NFT), and a concentration of an alloying metal in the portion of the feature may be defined by an atomic percentage of the total atomic composition of the portion of the feature that is occupied by the alloying metal, or by a weight percentage of a total atomic or molecular weight of the portion of the feature that is occupied by the alloying metal. Hereafter, a concentration of an alloying metal in a feature or portion of a feature comprising a thermally-stabilized plasmonic alloy is defined by an atomic percentage of a total atomic composition of the feature or portion of the feature that is occupied by the alloying metal.

A concentration of an alloying metal in a thermally-stabilized plasmonic alloy may be characterized by various laboratory techniques. In one example, inductively coupled plasma optical emission spectroscopy (ICP-OES) is used to determine a concentration of a material dispersed in a matrix. In the example of ICP-OES, a deposited film (e.g., a film of a thermally-stabilized plasmonic alloy used to fabricate a feature of NFT 250 or another feature of HAMR head 240 of FIG. 2) is dissolved in an acidic solution and, in some instances, diluted. The solution is placed in a spectrometer and atomized in an argon plasma. The atoms of the solution emit light at wavelengths which are characteristic of the constituent elements. The relative intensity of emission of a characteristic wavelength is proportional to the concentration of its associated element in the solution, and a comparison of the spectrum emitted from the solution to an emission of a known standard may, in some instances, allow the relative concentrations of the constituent elements to be determined in atomic percentage (i.e., at. %). In the example of an alloying metal in a thermally-stabilized plasmonic alloy, a measurement of a concentration of the alloying metal using ICP-OES may provide the atomic percentage of the alloying metal in the thermally-stabilized plasmonic alloy. The atomic percentage of the alloying metal may be used along with the atomic weight to determine weight percent (wt. %) of the alloying metal in the thermally-stabilized plasmonic alloy. In the present disclosure, a concentration of an alloying metal in a thermally-stabilized plasmonic alloy will be reported as an atomic percentage (at. %). In some examples, the concentration of an alloying metal in a thermally-stabilized plasmonic alloy is up to about 20 at. %. In some examples, the concentration of an alloying metal in a thermally-stabilized plasmonic alloy us up to about 6 at. %. In some examples, the concentration of an alloying metal in a thermally-stabilized plasmonic alloy is from about 6 at. % to about 20 at. %.

In accordance with techniques of this disclosure, a method for making a thermally-stabilized plasmonic alloy feature of an NFT of a HAMR head comprises the steps of (a) providing a substrate to contain features of the heat-assisted magnetic recording head; (b) supporting the substrate in a deposition chamber; (c) providing, on the substrate, an exposed surface for deposition, wherein the exposed surface for deposition is a surface of a first feature of the heat-assisted magnetic recording head; (d) elevating a temperature of the substrate; and (e) depositing a plasmonic metal and an alloying metal directly onto the exposed surface for deposition to form the thermally-stabilized plasmonic alloy feature.

A provided substrate may be a wafer on which a plurality of HAMR heads is fabricated. In some examples, an apparatus for forming a thermally-stabilized plasmonic alloy (e.g., a vacuum deposition system) includes a stage which is configured to support the substrate. A substrate may include a provided surface for deposition on which a thermally-stabilized plasmonic alloy is to be deposited. For example, the plurality of HAMR heads may include a feature or features which have already been fabricated (e.g., deposited in previous process steps), and a surface for deposition may be an exposed surface of one of these features. In some examples, a provided surface for deposition is an exposed surface of an optical layer of a HAMR head which is being fabricated. In one example, a provided surface for deposition is an exposed surface of a waveguide of a HAMR head which is being fabricated. A provided surface for deposition on which a thermally-stabilized plasmonic alloy is to be deposited may be an exposed surface of an NFT, or an exposed surface of a feature of an NFT. In some examples, a provided surface for deposition is an exposed surface a peg of an NFT. In some examples, a provided surface for deposition is an exposed surface a disk of an NFT.

An apparatus for forming a thermally-stabilized plasmonic alloy (e.g., a vacuum deposition system) may be configured with a means of introducing heat to the formation process by heating the substrate to a temperature. Heating the substrate prior to the formation of a thermally-stabilized plasmonic alloy may elevate a temperature of a surface for deposition on which the thermally-stabilized plasmonic alloy is to be deposited. In some scenarios, the step of heating the substrate to a temperature includes activating a heater (e.g., a resistive heater) which is coupled to a stage supporting the substrate. In other examples, the step of heating the substrate to a temperature includes activating a heater (e.g., an infrared heater) which is placed proximal to a stage supporting the substrate. In one example, activating a heater which is coupled to a stage supporting the substrate includes increasing the temperature of the heater to a range of about 175° C. to about 250° C.

In some scenarios, the step of heating the substrate to a temperature includes activating the heater and waiting for a specified soak time prior to the deposition of a thermally-stabilized plasmonic alloy. Waiting for a specified soak time may, in some scenarios, enable the temperature of a surface for deposition to increase, equilibrate, and stabilize prior to depositing the thermally-stabilized plasmonic alloy onto the surface for deposition. In one example, the soak time is about 2 minutes to about 15 minutes. In another example, the soak time is about 5 minutes to about 10 minutes. In another example, the soak time is about 10 minutes. In another example, the soak time is about 5 minutes.

Maintaining the application of heat to the substrate during the deposition of the thermally-stabilized plasmonic alloy, for example by leaving the heater activated during the deposition, may maintain the surface for deposition at an elevated temperature during the deposition. A feature which includes the thermally-stabilized plasmonic alloy (e.g., a feature of an NFT) may be deposited directly onto an exposed surface for deposition (e.g., a surface of an optical layer of a HAMR head) while the surface for deposition is at an elevated temperature. Depositing a thermally-stabilized plasmonic alloy directly onto an exposed surface for deposition while the surface for deposition is at an elevated temperature may, in some scenarios, promote the formation and growth of grains of one or more alloy phases which are stable at the elevated temperature and remain metastable upon completion of the deposition and subsequent cooling of the surface for deposition. Depositing a thermally-stabilized plasmonic alloy onto a surface for deposition while the surface for deposition is at an elevated temperature may, in some scenarios, increase the diffusion rate of plasmonic metal and/or alloying metal atoms such that preferred grain bulk and grain boundary structures may be achieved. Grains with preferred bulk and/or boundary structures may demonstrate improved thermal stability over grains which are deposited onto a surface for deposition which is not at an elevated temperature during deposition. A feature of a HAMR head comprising the thermally-stabilized plasmonic alloy which is deposited onto a surface for deposition while the surface for deposition is at an elevated temperature may demonstrate better thermal stability than a similar feature which is deposited onto a surface for deposition while the surface for deposition is not at the elevated temperature.

A thermally-stabilized plasmonic alloy may be deposited with one of several processes, including RF sputtering, DC sputtering, thermal evaporation, plating, or electron beam evaporation. An apparatus for forming a thermally-stabilized plasmonic alloy (e.g., a vacuum deposition system) may be configured with one or more deposition sources (e.g., sputtering target(s), evaporation sources). The step of depositing a feature of a HAMR head which includes a thermally-stabilized plasmonic alloy may include the step of depositing a plasmonic metal and an alloying metal from at least one deposition source. In some examples, the step of depositing the plasmonic metal includes depositing gold. In some examples, the step of depositing the alloying metal includes depositing nickel.

In some examples, a process for depositing a feature of a HAMR head which includes a thermally-stabilized plasmonic alloy includes sputtering a plasmonic metal and an alloying metal from a single target comprising the plasmonic metal and the alloying metal. In some examples, a process for depositing a feature of a HAMR head which includes a thermally-stabilized plasmonic alloy includes sputtering a plasmonic metal from a first sputtering target and sputtering an alloying metal from a second sputtering target. An evaporation process of a thermally-stabilized plasmonic alloy may include evaporating a plasmonic metal from a first source and evaporating an alloying metal from a second source. An evaporation process of a thermally-stabilized plasmonic alloy may include evaporation of a plasmonic metal and an alloying metal from a single source.

In some examples, a process for depositing a feature of a HAMR head which includes a thermally-stabilized plasmonic alloy includes codepositing a plasmonic metal and an alloying metal from different sources, where codepositing includes simultaneously depositing the respective metals from their respective sources. A process for depositing a feature of a HAMR head which includes a thermally-stabilized plasmonic alloy may, in other examples, include depositing a plasmonic metal and an alloying metal from different sources, where the deposition of the plasmonic metal and the deposition of the alloying metal do not occur simultaneously (e.g., alternating deposition cycles of the plasmonic metal and the alloying metal from their respective deposition sources).

A process for depositing a thermally-stabilized plasmonic alloy may target a concentration of the alloying metal in the thermally-stabilized plasmonic alloy. In one example, a process for depositing a feature of an NFT of a HAMR head includes depositing a thermally-stabilized plasmonic alloy, wherein the composition of the alloying metal in the thermally-stabilized plasmonic alloy is up to about 20 at. %. In another example, a process for depositing a feature of an NFT of a HAMR head includes depositing a thermally-stabilized plasmonic alloy, wherein the composition of the alloying metal in the thermally-stabilized plasmonic alloy is up to about 6 at. %. In yet another example, a process for depositing a feature of an NFT of a HAMR head includes depositing a thermally-stabilized plasmonic alloy, wherein the composition of the alloying metal in the thermally-stabilized plasmonic alloy is from about 6 at. % to about 20 at. %.

In some examples, a concentration of an alloying metal in a thermally-stabilized plasmonic alloy is controlled by the relative deposition rates of the plasmonic metal and the alloying metal. In some scenarios, a plasmonic metal may be deposited from a first source at a first deposition rate, and an alloying metal may be deposited from a second source at a second deposition rate. In one example, the step of depositing a thermally-stabilized plasmonic alloy with a target concentration of an alloying metal includes the steps of depositing a plasmonic material from a first deposition source at a first deposition rate (e.g., a first deposition rate controlled by the power applied to the first target) and depositing an alloying metal from a second deposition source at a second deposition rate (e.g., a second deposition rate controlled by the power applied to the second target).

In some examples, a concentration of an alloying metal in a thermally-stabilized plasmonic alloy is controlled by a composition of a source. A sputtering target may, for example, comprise a plasmonic metal at a first percentage of the composition of the target and an alloying metal at a second, different percentage of the composition of the target. In one example, a sputtering target may include a first composition of a plasmonic material and a second composition of an alloying metal such that a deposition process from this target results in these components being deposited at different rates and a resultant concentration of the alloying metal within the thermally-stabilized plasmonic alloy. In these examples, the relative compositions of the respective components (i.e., the ratio of the plasmonic material to the alloying metal) may be targeted to achieve a desired concentration of an alloying metal in a thermally-stabilized plasmonic alloy.

Figure 3:
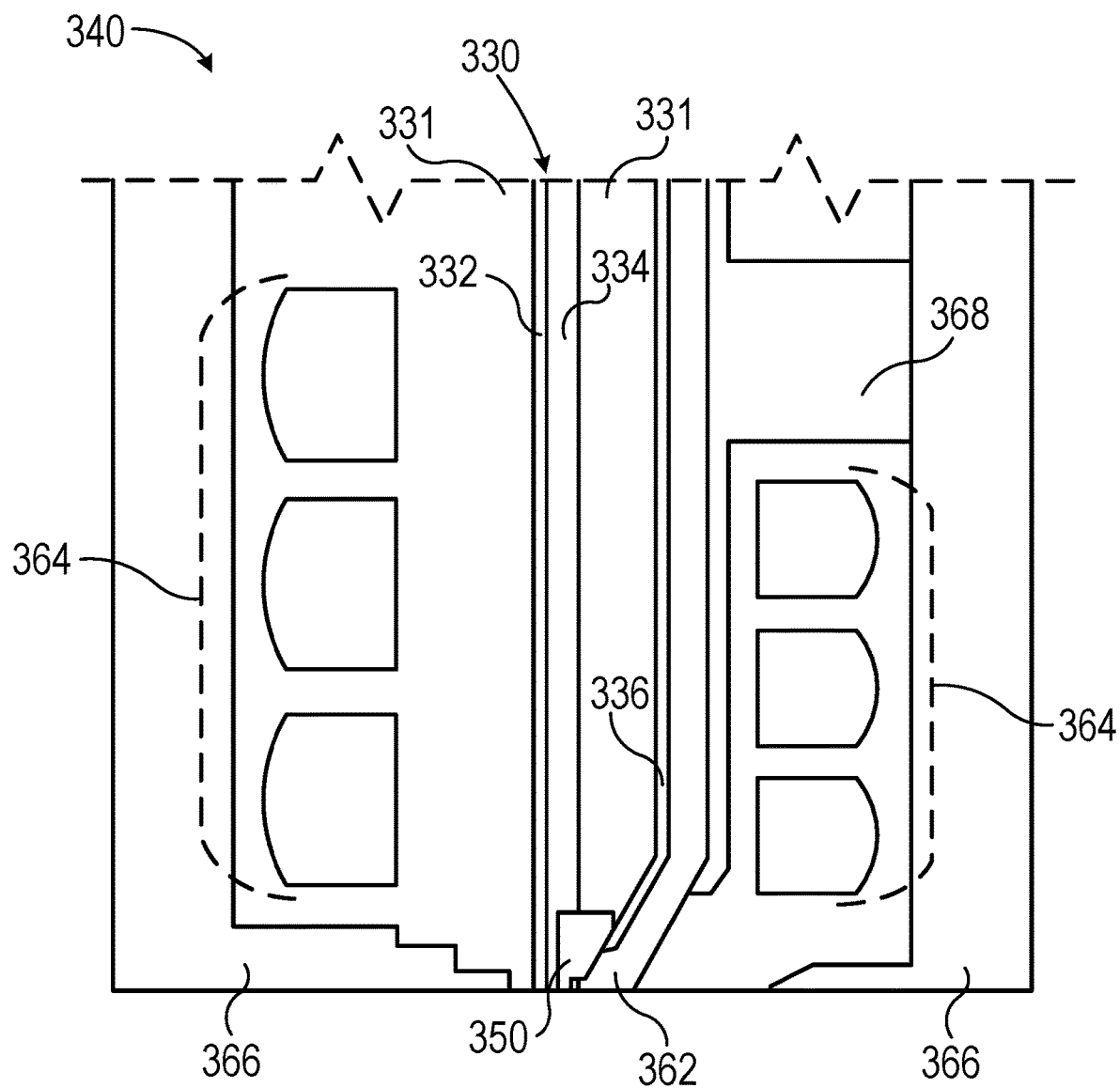
FIG. 3 is a cross-sectional view an example HAMR head, in accordance with aspects of this disclosure.

Referring now to FIG. 3, there is shown a cross-sectional view of an example HAMR head, in accordance with aspects of this disclosure. HAMR head 340 includes a waveguide 330, cladding layers 331, an NFT 350, a diffuser 336, a write pole 362, writer coils 364, return poles 366, and a yoke/via structure 368.

In an example HAMR HDD, a drive controller may output an electrical current through writer coils 364, which are configured to carry the electrical current and induce a magnetic field in write pole 362. Write pole 362 is configured to direct the magnetic field produced by writer coils 364 toward a surface of a magnetic disk to preferably orient grains of the magnetic disk into bits of data which are stored for later retrieval. An example magnetic field induced in write pole 362 may be directed toward and focused on an area external to recording head 340, such as an area on a surface of a magnetic disk, and returned to recording head 340 through return pole(s) 366. The magnetic field which returns to recording head 340 through return pole(s) 366 may then be directed back to write pole 362 through a channel such as yoke/via structure 368.

In some examples, a light source, such as laser 226 of FIG. 2, emits photons of an approximate wavelength which are directed toward NFT 350 by waveguide 330. Optical layers such as waveguide 330 and cladding layers 331 are configured to support LSP generation on NFT 350 by directing photons from a light source toward NFT 350 and couple the photons to a feature or features of NFT 350 in order to generate LSPs in NFT 350 through resonance coupling of the photons with free electrons of NFT 350. NFT 350 may be located proximal to waveguide 330, cladding layer(s) 331, and/or other optical layers, and is configured to support the generation of LSPs and focus near-field energy of the LSP distribution on a surface of a magnetic disk. Waveguide 330 and cladding layers 331 may include dielectric materials (e.g., aluminum oxide, silicon dioxide, niobium oxide).

Waveguide 330 and cladding layers 331 may include dimensions and features which shift the momentum vector (i.e., the k vector) of the incident photons from a laser or other light source so that a component of the k vector of an incident photon of a given frequency (i.e., $\omega$) which is parallel to a waveguide 330/NFT 350 interface matches the momentum vector k of an associated LSP mode of the given frequency $\omega$. In one example, a waveguide includes gratings with periodic patterns which can shift (e.g., increase) a momentum of an incident photon. In other examples, a waveguide includes multiple layers of materials of different refractive indices, where a momentum of an incident photon in a first material of a first refractive index is shifted upon transmission into a second material of a second refractive index. Waveguide 330, for example, includes a waveguide core 332 and a core-to-NFT spacing (CNS) layer 334. Waveguide core 332 may include a first dielectric material (e.g., niobium oxide) of a first refractive index, and CNS layer 334 may include a second dielectric material (e.g., aluminum oxide, silicon dioxide) of a second refractive index. Such features and structures of waveguide 330 may, in some scenarios, manipulate a momentum component of an incident photon from a laser or other light source and match the momentum component of the incident photon to a momentum component of a surface plasmon mode of NFT 350 such that photons directed by waveguide 330 may couple to free electrons of NFT 350 and excite one or more LSP resonance modes.

Near-field transducer 350 may be prone to thermal defects, instability, and/or degradation at temperatures which are encountered by HAMR head 340 under normal operating conditions. In accordance with aspects of this disclosure, an example HAMR head (e.g., HAMR head 340) comprises one or more features comprising a thermally-stabilized plasmonic alloy, wherein the one or more features comprises an NFT (e.g., NFT 350). The inclusion of a thermally-stabilized plasmonic alloy in NFT 350 may, in some examples, provide NFT 350 with improved thermal stability over a comparable NFT which does not include a thermally-stabilized plasmonic alloy. The improved thermal stability that the thermally-stabilized plasmonic alloy provides to NFT 350 may reduce the formation, growth, propagation of defects, and/or migration of grain boundaries, when NFT 350 encounters thermal stress during repeated HAMR write processes. The improved thermal resistance of NFT 350 may, in some instances, reduce or prevent deformation, recession, and/or shrinkage of features of NFT 350, and/or delamination of NFT 350 from other features of HAMR head 340 which are coupled to NFT 350 (e.g., waveguide 330, cladding layers 331).

In some instances, the plasmonic figure of merit in a HAMR head which includes a light source, optical layer(s), and an NFT is maximized when the NFT is directly coupled to one or more optical layers. That is, coupling between a photon in an optical layer and a plasmonic mode in a plasmonic feature of an NFT (e.g., a disk, a peg) may be enhanced when the plasmonic metal of the plasmonic feature is directly coupled to the optical layer. However, plasmonic metals often demonstrate poor adhesion to dielectric materials such as those used for optical layers in HAMR heads, and in some examples an adhesion layer disposed between a plasmonic NFT feature and an optical layer is necessary to provide a stable interface between the NFT feature and the optical layer. The presence of the adhesion layer between the plasmonic metal and optical layer may, in some scenarios, reduce the plasmonic figure of merit when compared to a similar structure where the plasmonic metal is directly coupled to the optical layer without an adhesion layer.

In some examples, a plasmonic metal may demonstrate stable adhesion to an optical layer but may not demonstrate efficient LSP generation and/or may be prone to other defects such as corrosion. In these examples, the use of a plasmonic metal with stable adhesion to an optical layer but with a low plasmonic figure of merit may result in lower LSP efficiency and/or higher operating temperature when compared with a HAMR head which includes a preferred plasmonic metal feature which is coupled directly to an optical layer.

Reducing the plasmonic figure of merit in a HAMR head, such as with the use of an adhesion layer disposed between a plasmonic metal layer and an optical layer, or with the use of a plasmonic metal with stable adhesion to an optical layer but with lower LSP efficiency than another higher efficiency plasmonic metal, may increase the laser power which is required to generate the LSP distribution which is needed for operation of the HAMR head. This increase in laser power may increase operating temperatures of the HAMR head and its features, potentially increasing the rate of defect formation and propagation, and, in some scenarios, reducing thermal stability and lifetime of the HAMR head. Thus, it is preferable to have a HAMR head wherein a plasmonic feature, such as a disk or a peg of an NFT, includes an efficient plasmonic material and is directly coupled to an optical layer. In accordance with techniques of this disclosure, an example HAMR head comprises an NFT comprising a thermally-stabilized plasmonic alloy, and an optical layer having an NFT-facing surface, wherein the NFT has an optical layer-facing surface, wherein the optical layer-facing surface of the NFT comprises the thermally-stabilized plasmonic alloy, and wherein the optical layer-facing surface of the NFT directly contacts the NFT-facing surface of the optical layer. In some examples, a surface or surfaces of an NFT are directly coupled to one or more optical layers. NFT 350 of FIG. 3 may be directly coupled to waveguide 330 and/or a cladding layer 331. In the example of HAMR head 340 of FIG. 3, a surface of NFT 350 may be directly coupled to a surface of CNS layer 334.

Diffuser 336 of FIG. 3 is a heat sink structure which is configured to draw heat generated by the HAMR write process away from NFT 350, write pole 362, and other features of HAMR head 340, and dissipate the heat toward other, less thermally sensitive areas of HAMR head 340 and its associated slider. In some examples, diffuser 336 is part of a larger heat sink structure of HAMR head 340. Diffuser 336 may include a plasmonic metal, and in some instances includes the same plasmonic metal or metals that are included in NFT 350.

Heat sink structures such as diffuser 336 may be prone to similar thermally-induced defects as NFT 350. For example, diffuser 336 may exhibit deformation, voiding, shrinkage, and/or delamination from surrounding interfaces (e.g., the diffuser 336/write pole 362 interface). The inclusion of a thermally-stabilized plasmonic alloy in diffuser 336 may, in some instances, increase the thermal stability of diffuser 336 when compared to a similar diffuser which does not include a thermally-stabilized plasmonic alloy.

Figure 4A:
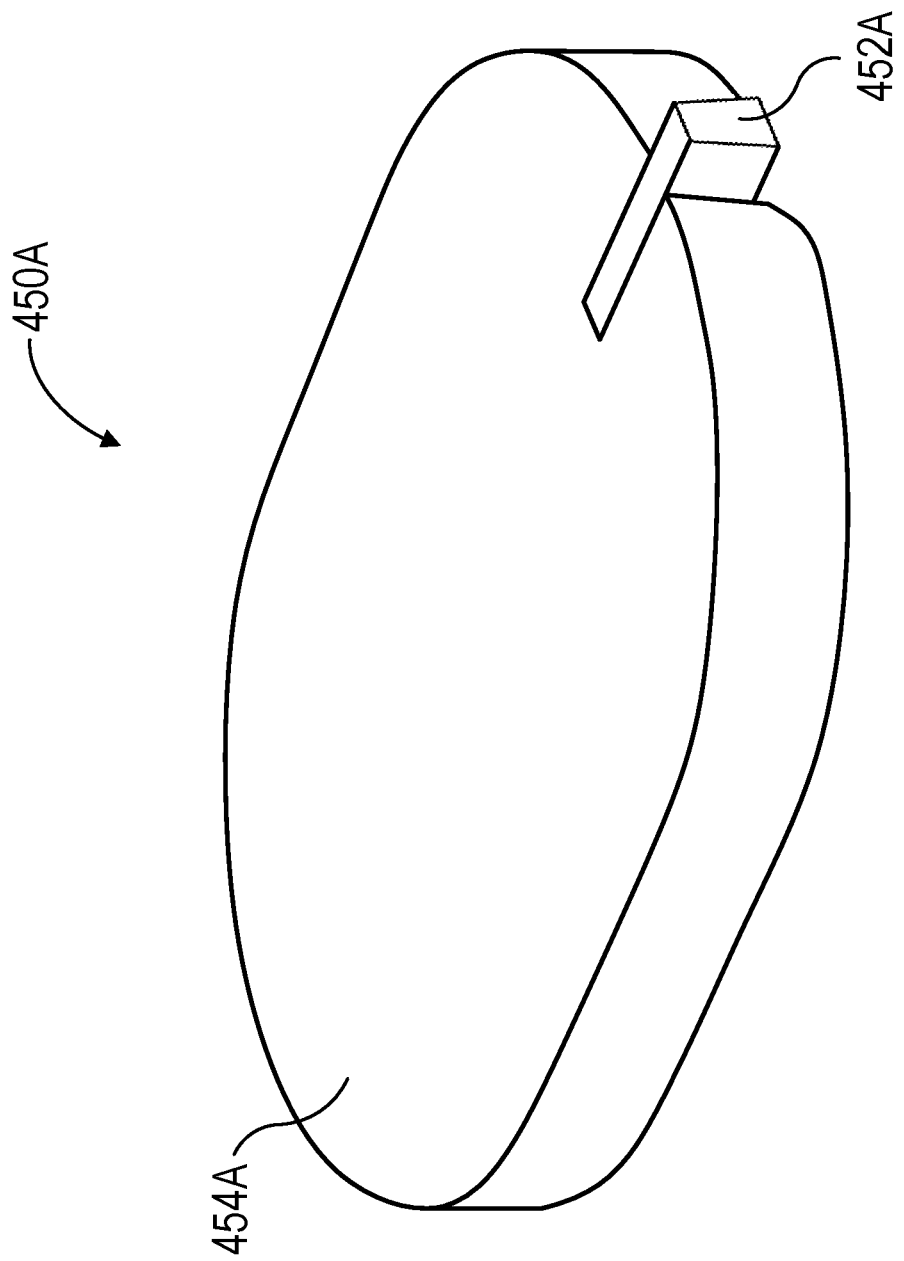
FIG. 4A is a perspective view of an example disk and peg of an NFT of a HAMR head, in accordance with aspects of this disclosure.

FIG. 4A is a perspective view of an example disk and peg of an NFT of a HAMR head, in accordance with aspects of this disclosure. NFT 450A may be an example of NFT 350 of FIG. 3. NFT 450A includes a disk (DSC) 454A and a peg (PEG) 452A. DSC 454A is configured to support LSP distributions of one or more modes (e.g., a transverse electric (TE) mode). An LSP distribution may be generated on NFT 450A by coupling between free electrons of DSC 454A and incident photons which are generated by a light source (e.g., laser 226 of FIG. 2) and delivered to NFT 450A by a waveguide (e.g., waveguide 330 of FIG. 3) or other optical delivery system. PEG 452A is configured to consolidate an LSP distribution of NFT 450A and focus and direct its near-field energy toward an area external to its respective HAMR head, such as on a surface of a magnetic disk.

DSC 454A and PEG 452A include materials and dimensions which may promote the localization of generated LSPs and the focus of near-field energy of the LSP distribution on an area external to the recording head. In this way, the near-field energy which is focused on an area external to the recording head is a product of resonant amplification (e.g., generating an LSP distribution from resonant coupling of free electrons of DSC 454A to incident photons from a light source) and non-resonant amplification (e.g., enhancement of the near-field by localization of the LSP distribution on PEG 452A).

In some examples, a HAMR head includes an NFT (e.g., NFT 450A), wherein the NFT comprises a disk (e.g., DSC 454A), and wherein the disk comprises a thermally-stabilized plasmonic alloy. In some examples, a HAMR head includes an NFT (e.g., NFT 450), wherein the NFT comprises a peg (e.g., PEG 452A), and wherein the peg comprises a thermally-stabilized plasmonic alloy.

An example HAMR head may comprise a plurality of features, wherein a first feature of the plurality of features comprises a first thermally-stabilized plasmonic alloy, and wherein a second feature of the plurality of features comprises a second thermally-stabilized plasmonic alloy. In one example, a HAMR head comprises an NFT (e.g., NFT 450), wherein the NFT comprises a disk (e.g., DSC 454A) and a peg (e.g., PEG 452A), wherein the peg comprises a first thermally-stabilized plasmonic alloy, and wherein the disk comprises a second thermally-stabilized plasmonic alloy. The first thermally-stabilized plasmonic alloy and second thermally-stabilized plasmonic alloy may differ in plasmonic metal(s), alloying metal(s), concentrations of the alloying metal(s), formation process and conditions, or other defining characteristics.

Using different thermally-stabilized plasmonic alloys for different features of a HAMR head may, in some examples, provide the flexibility to tune the properties of the thermally-stabilized plasmonic alloys to address the defects and modes of degradation to which their respective features are most susceptible. For example, a first feature which is active in the LSP generation process, such as DSC 454A, may benefit from a thermally-stabilized plasmonic alloy with optical properties and a plasmonic figure of merit which are close to those of the constituent plasmonic metal, such that the LSP formation and maintenance portions of the HAMR write process are not significantly impacted by the inclusion of the thermally-stabilized plasmonic alloy. A second feature, such as PEG 452A, may not directly participate in the LSP generation process but rather may be configured to consolidate an LSP distribution during a write cycle, and may be exposed to higher temperatures than other features such as DSC 454A. PEG 452A, for example, may not require the same optical properties that a feature like DSC 454A does, and may benefit from having a thermally-stabilized plasmonic alloy with a higher concentration of an alloying metal than the concentration of an alloying metal in the thermally-stabilized plasmonic alloy of DSC 454A. That is, a first feature and a second feature of a HAMR head may comprise a first thermally-stabilized plasmonic alloy and a second thermally-stabilized plasmonic alloy, respectively, wherein the first thermally-stabilized plasmonic alloy includes a first concentration of an alloying metal, and wherein the second thermally-stabilized plasmonic alloy include a second concentration of an alloying metal.

In one example, a HAMR head comprises an NFT (e.g., NFT 450A), wherein the NFT comprises a disk (e.g., DSC 454A) and a peg (e.g., PEG 452A), wherein the peg comprises a first thermally-stabilized plasmonic alloy, wherein the disk comprises a second thermally-stabilized plasmonic alloy, and wherein the concentration of an alloying metal in the first thermally-stabilized plasmonic alloy is from about 6 at. % to about 20 at. %, as measured by ICP-OES. In another example, a HAMR head comprises an NFT (e.g., NFT 450A), wherein the NFT comprises a disk (e.g., DSC 454A) and a peg (e.g., PEG 452A), wherein the wherein the peg comprises a first thermally-stabilized plasmonic alloy, wherein the disk comprises a second thermally-stabilized plasmonic alloy, and wherein the concentration of an alloying metal in the second thermally-stabilized plasmonic alloy is up to about 6 at. %, as measured by ICP-OES. The inclusion of a thermally-stabilized plasmonic alloy with a high concentration of an alloying metal (e.g., up to about 20 at. %) in features which are particularly prone to thermal exposure and degradation may improve the performance, lifetime, and/or stability of a HAMR head over a comparable HAMR head which does not include a thermally-stabilized plasmonic alloy with a high concentration of an alloying metal in features which are particularly prone to thermal exposure and degradation.

Figure 4B:
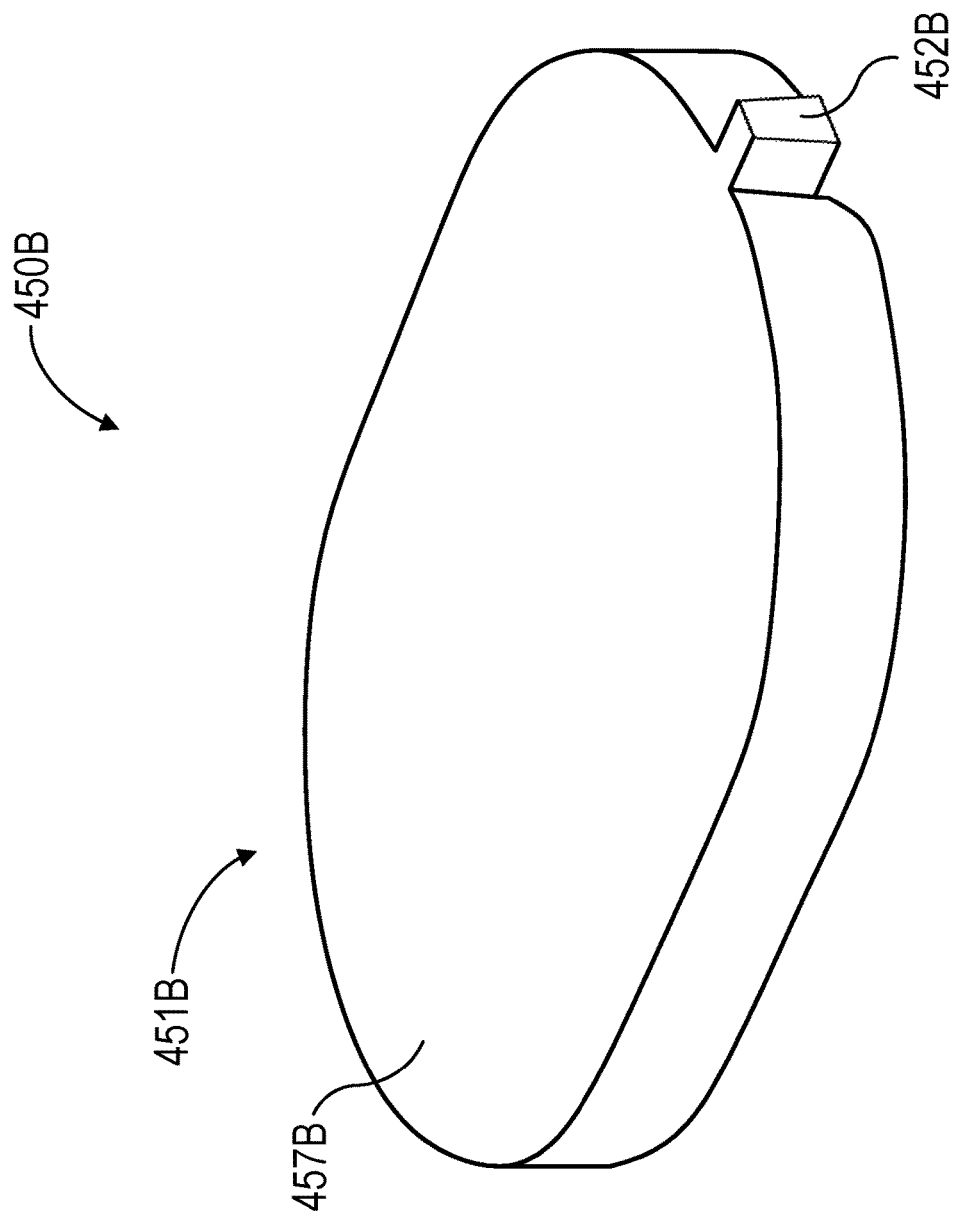
FIG. 4B is a perspective view of an example disk and peg of an NFT of a HAMR head, in accordance with aspects of this disclosure.

FIG. 4B is a perspective view of an example NFT of a HAMR head, in accordance with aspects of this disclosure. NFT 450B may be an example of NFT 350 of FIG. 3. A peg anchor 457B and a peg (PEG) 452B of this example are part of a near-field emitter 451B of NFT 450B. Near-field emitter 451B a single, continuous feature. That is, PEG 452B and peg anchor 457B are regions or features of a single piece. Near-field emitter 451B may, for example, be deposited during a single manufacturing level or step (e.g., a photolithography level, a metal deposition step), with the shape and dimensions of PEG 452B and peg anchor 457B defined by a lithography pattern. PEG 452B and peg anchor 457B of the example of FIG. 4B may include a thermally-stabilized plasmonic alloy.

Figure 5A:
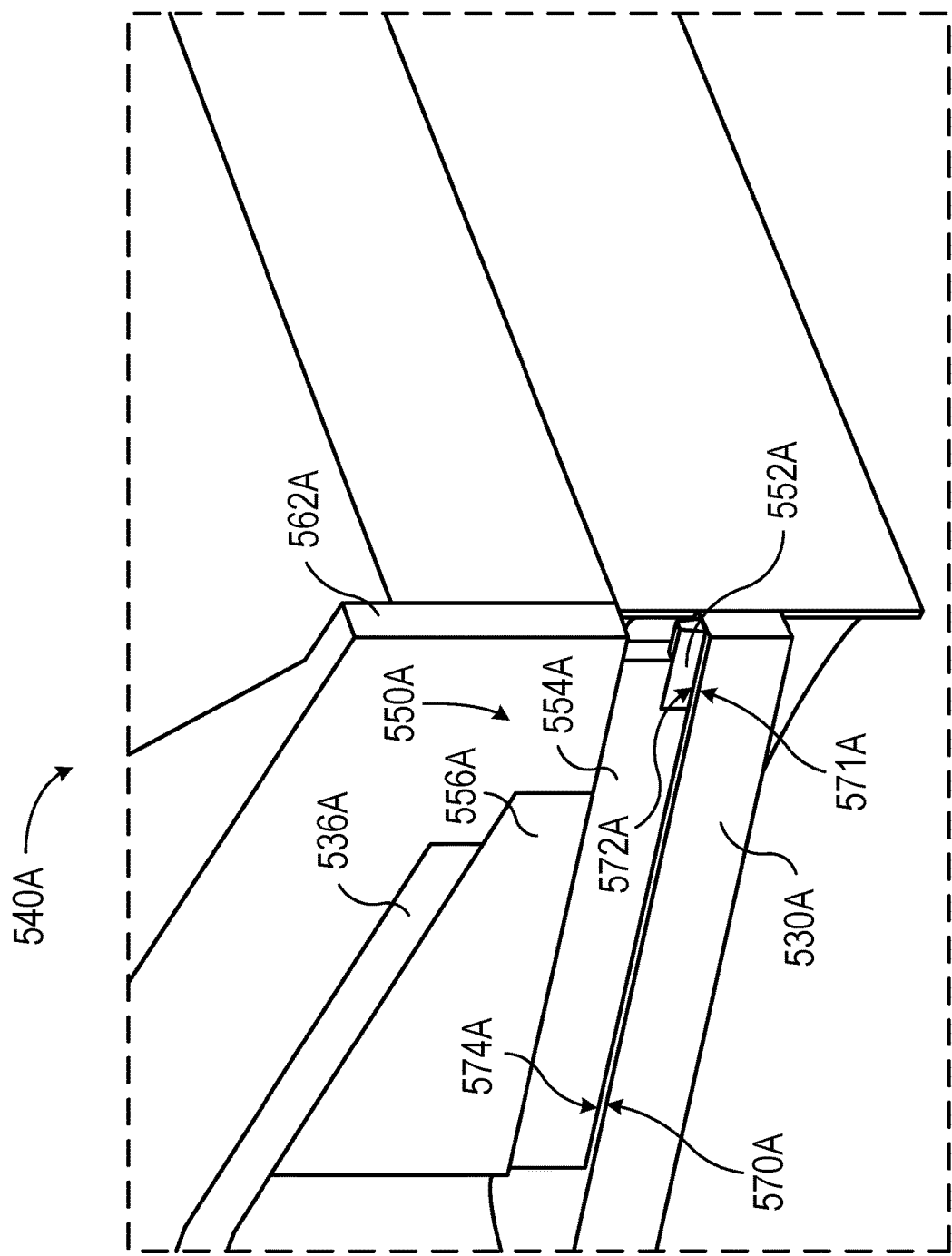
FIG. 5A is a perspective view of an example HAMR head, in accordance with aspects of this disclosure.
Figure 5B:
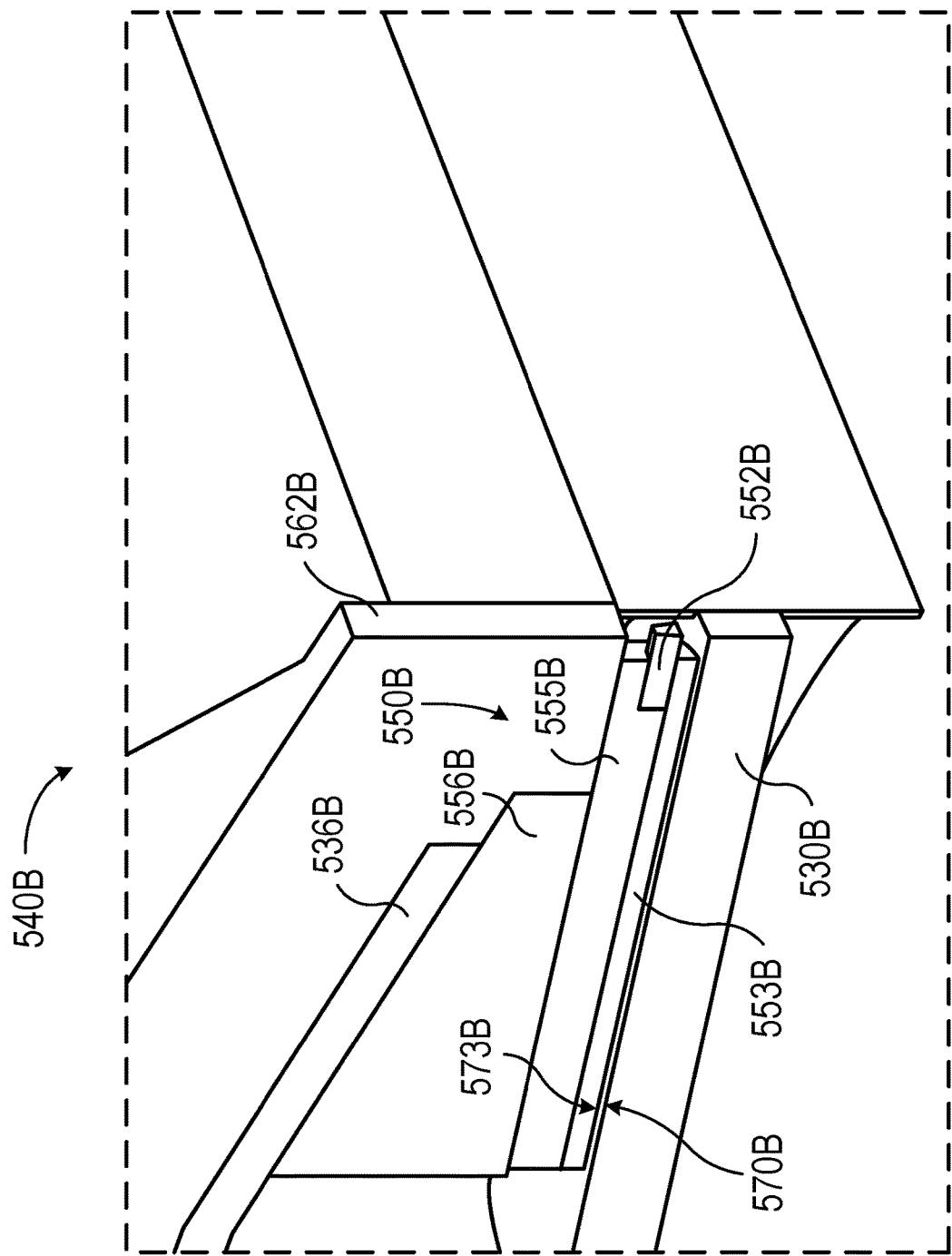
FIG. 5B is a perspective view of an example HAMR head, in accordance with aspects of this disclosure.

FIGS. 5A, 5B, and 5C are perspective views of example HAMR heads, in accordance with aspects of this disclosure. HAMR heads 540A, 540B, and 540C of FIGS. 5A, 5B, and 5C, respectively, each include a waveguide (530A, 530B, and 530C), a diffuser (536A, 536B, and 536C), a heat sink disk (HDSCs 556A, 556B, and 556C), a write pole (562A, 562B, and 562C), and an NFT (550A, 550B, and 550C). Waveguides 530A, 530B, and 530C may include multiple optical layers (e.g., a waveguide core, a core-to-NFT spacing layer), or may include a single optical layer. HDSCs 556A of FIG. 5A, 556B of FIGS. 5B, and 556C of FIG. 5C are configured to draw heat away from other disks and the peg of the respective NFT and direct the heat toward the respective diffuser (diffusers 536A, 536B, and 536C, respectively).

Referring now to FIG. 5A, NFT 550A includes a disk (DSC) 554A which is configured to support one or more LSP modes (e.g., a transverse electric (TE) mode) generated by coupling between free electrons of DSC 554A to an incident photon generated by a light source (e.g., laser 226 of FIG. 2) and delivered to NFT 550A by waveguide 530A. NFT 550A includes a peg (PEG) 552A, which is configured to consolidate an LSP distribution and direct the near-field energy of the LSP distribution toward an area external to HAMR head 540A (e.g., toward a surface of a magnetic disk).

DSC 554A may comprise a thermally-stabilized plasmonic alloy. In some instances, the inclusion of a thermally-stabilized plasmonic alloy in DSC 554A enables it to directly contact an optical layer, such as waveguide 530A, without the need for an adhesion layer disposed between the optical layer and the disk. That is, an example HAMR head comprises an NFT comprising a disk, wherein the HAMR head further comprises an optical layer (e.g., waveguide 530A) having an NFT-facing surface, wherein the disk has an optical layer-facing surface, wherein the optical layer-facing surface of the disk comprises the thermally-stabilized plasmonic alloy, and wherein the optical layer-facing surface of the disk directly contacts the NFT-facing surface of the optical layer. In the example of HAMR head 540A, waveguide 530A includes a surface which faces NFT 550A (hereafter NFT-facing surface 570A). DSC 554A includes a surface which faces waveguide 530A (hereafter waveguide-facing surface 574A). In examples where DSC 554A comprises a thermally-stabilized plasmonic alloy and wherein waveguide-facing surface 574A comprises the thermally-stabilized plasmonic alloy of DSC 554A, waveguide-facing surface 574A of DSC 554A may directly contact NFT-facing surface 570A of waveguide 530A without the need for an adhesion layer disposed between waveguide 530A and the disk. In some scenarios, coupling between a photon in a waveguide and a plasmonic mode of a disk may be enhanced when the plasmonic metal of a plasmonic feature (e.g., DSC 554A) is directly coupled to the waveguide. That is, an NFT with a disk which directly contacts a waveguide, such as an example of NFT 550A where DSC 554A comprises a thermally-stabilized plasmonic alloy, may demonstrate a higher plasmonic figure of merit than a similar NFT which does include a disk which directly contacts a waveguide.

PEG 552A may comprise a thermally-stabilized plasmonic alloy. In some instances, the inclusion of a thermally-stabilized plasmonic alloy in PEG 552A enables it to directly contact an optical layer, such as waveguide 530A, without the need for an adhesion layer disposed between the optical layer and the peg. That is, an example HAMR head comprises an NFT comprising a peg, wherein the HAMR head further comprises an optical layer (e.g., waveguide 530A) having an NFT-facing surface, wherein the peg has an optical layer-facing surface, wherein the optical layer-facing surface of the peg comprises the thermally-stabilized plasmonic alloy, and wherein the optical layer-facing surface of the peg directly contacts the NFT-facing surface of the optical layer. In the example of HAMR head 540A, waveguide 530A includes a surface which faces NFT 550A (hereafter NFT-facing surface 571A). PEG 552A includes a surface which faces waveguide 530A (hereafter waveguide-facing surface 572A). In examples where PEG 552A comprises a thermally-stabilized plasmonic alloy, and wherein waveguide-facing surface 572A comprises the thermally-stabilized plasmonic alloy of PEG 552A, waveguide-facing surface 572A of PEG 552A may directly contact NFT-facing surface 571A of the optical layer (i.e., waveguide 530A) without the need for an adhesion layer disposed between the optical layer and the peg.

An NFT may include more than one disk, with each disk configured for a specific function or function(s) in the HAMR write process. For example, a disk may be structured to support a transverse electric octupole LSP mode (e.g., TE10) and consolidate an LSP distribution at a particular location or area of the disk. A bottom disk (BDSC) or a sunken disk (SDSC) may be disposed proximal to a waveguide and configured to generate and support an LSP distribution through coupling of free electrons to incident photons which are delivered to the disk by the waveguide. Other disks may be configured to support NFT functions such as promoting LSP generation (e.g., through improving coupling efficiency, through reducing scattering of incident light from a light source), focusing LSP distributions, focusing near-field energy, managing and dissipating generated heat, reducing operating temperature(s) of the HAMR head features, and/or reducing laser power requirement. A middle disk (MDSC), for example, may assist with directing LSPs toward a respective peg and mitigate background fields. An SDSC may, in some scenarios, reduce temperature and laser power. In some examples, one or more disks of an NFT comprise a thermally-stabilized plasmonic alloy.

Referring now to FIG. 5B, NFT 550B includes DSC 553B and DSC 555B. In the example of NFT 550B, at least one disk, which may include DSC 553B, comprises a thermally stabilized plasmonic alloy. Waveguide 530B includes a surface which faces NFT 550B (hereafter NFT-facing surface 570B). DSC 553B includes a surface which faces waveguide 530B and comprises the thermally-stabilized plasmonic alloy of DSC 553B (hereafter waveguide-facing surface 573B). Waveguide-facing surface 573B may directly contact NFT-facing surface 570A without the need for an adhesion layer.

Referring now to FIG. 5C, NFT 550C includes an SDSC 553C and a near-field emitter 551C. In the example of FIG. 5C, NFT 550C includes a MDSC 555C. Near-field emitter 551C is disposed between and coupled to SDSC 553C and MDSC 555C. Near-field emitter 551C is a single, continuous piece that includes a PEG 552C and a peg anchor 557C. SDSC 553C, MDSC 555C, and/or near-field emitter 551C (i.e., PEG 552C and peg anchor 557C) may include a thermally-stabilized plasmonic alloy. In some examples, two or more of SDSC 553C, MDSC 555C, and/or near-field emitter 551C include the same thermally-stabilized plasmonic alloy. In some examples, two or more of SDSC 553C, MDSC 555C, and/or near-field emitter 551C (i.e., peg 552C and peg anchor 557C) include different thermally-stabilized plasmonic alloys.

FIGS. 6A-6D are cross-sectional views of example HAMR heads, in accordance with aspects of this disclosure. NFTs of these examples include features which are geometrically structured to target the excitation of specific LSP modes (e.g., one or more specific transverse electric (TE) modes) through the coupling of free electrons in the NFT to incident photons of an approximate wavelength. NFTs of these examples include features which are structured to focus near-field energy of an LSP distribution on an area external to the HAMR head, such as on a surface of a magnetic disk.

Figure 6A:
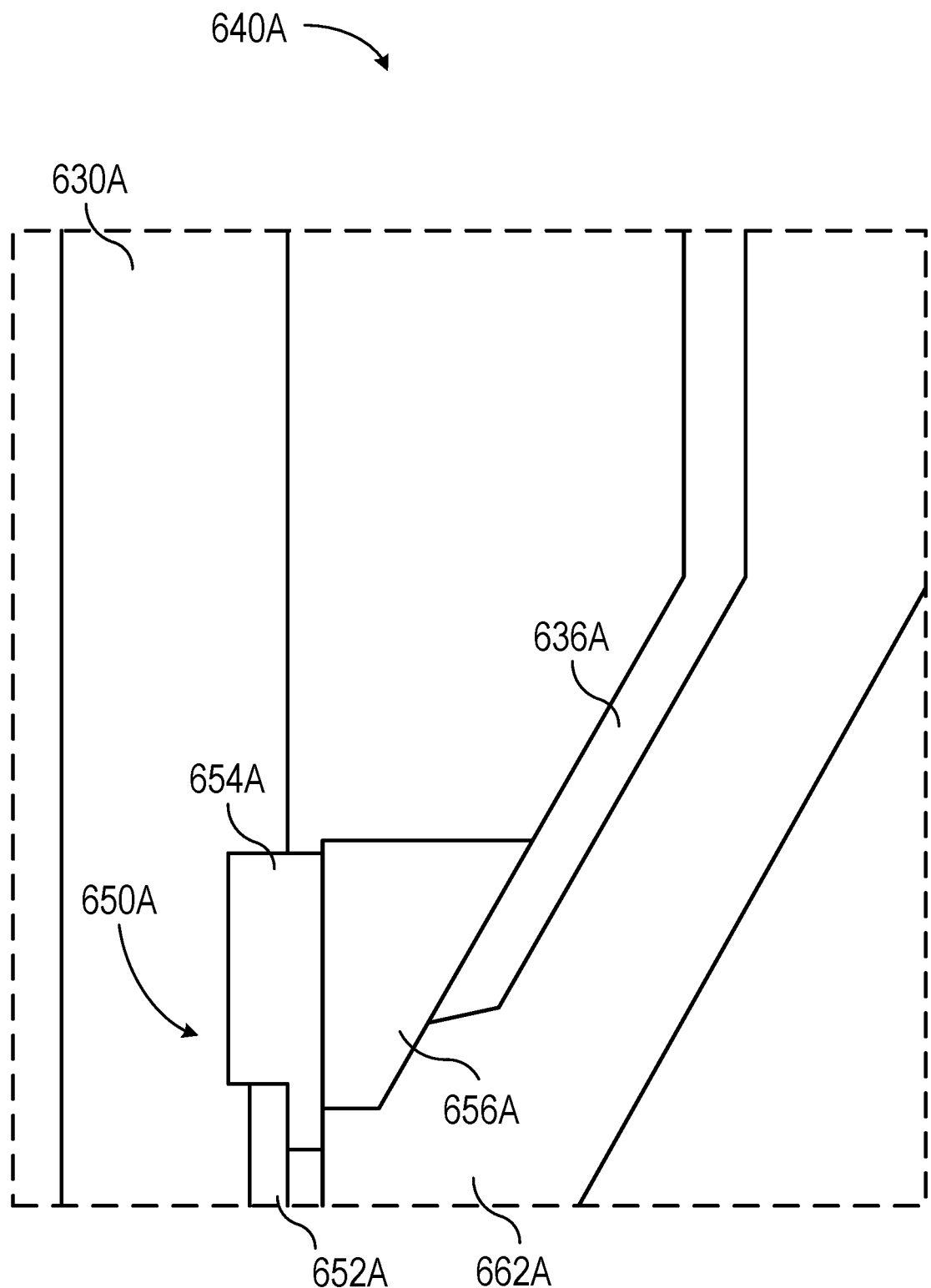
FIG. 6A is a cross-sectional view of an example HAMR head, in accordance with aspects of this disclosure.
Figure 6B:
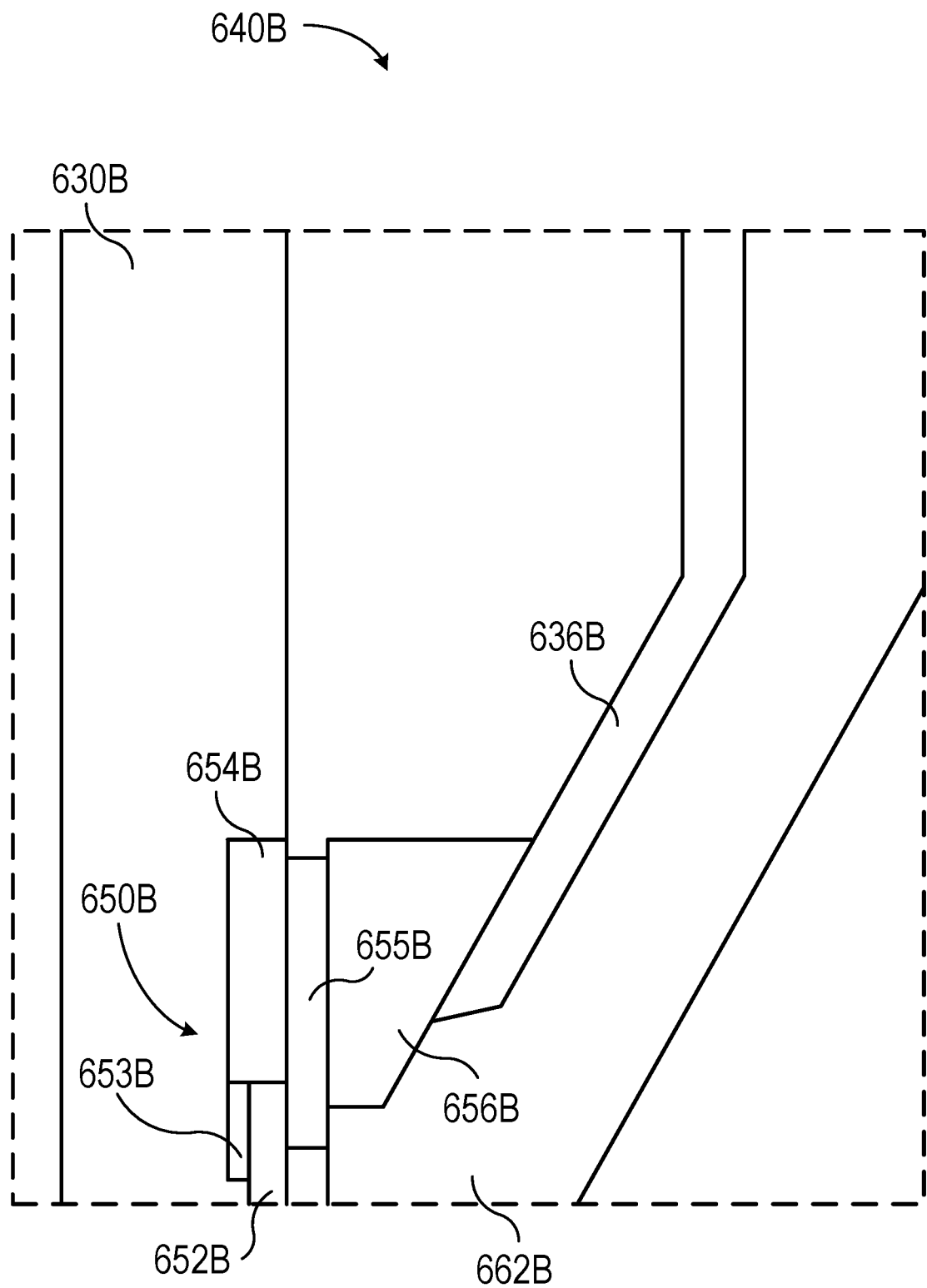
FIG. 6B is a cross-sectional view of an example HAMR head, in accordance with aspects of this disclosure.
Figure 6C:
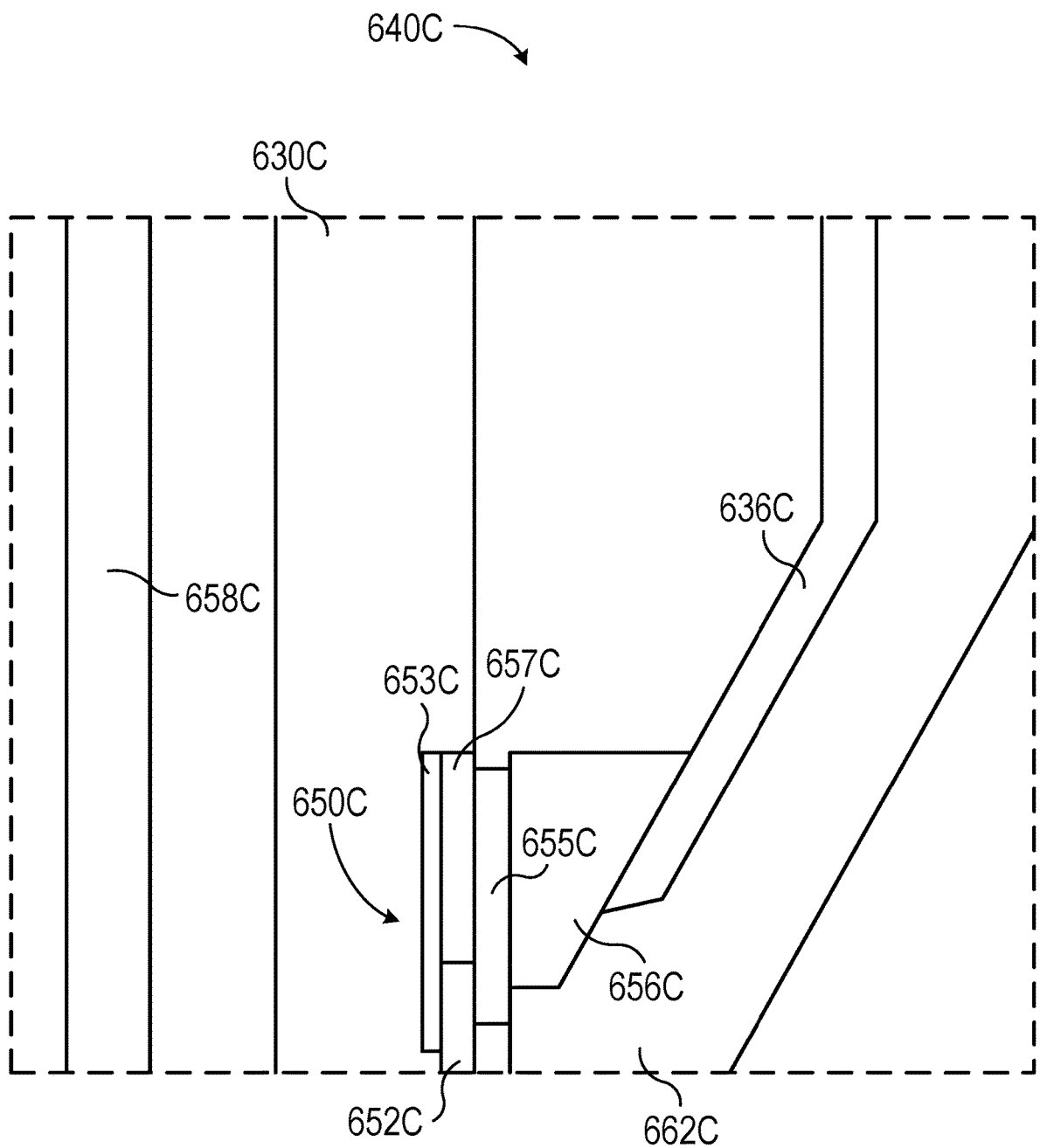
FIG. 6C is a cross-sectional view of an example HAMR head, in accordance with aspects of this disclosure.
Figure 6D:
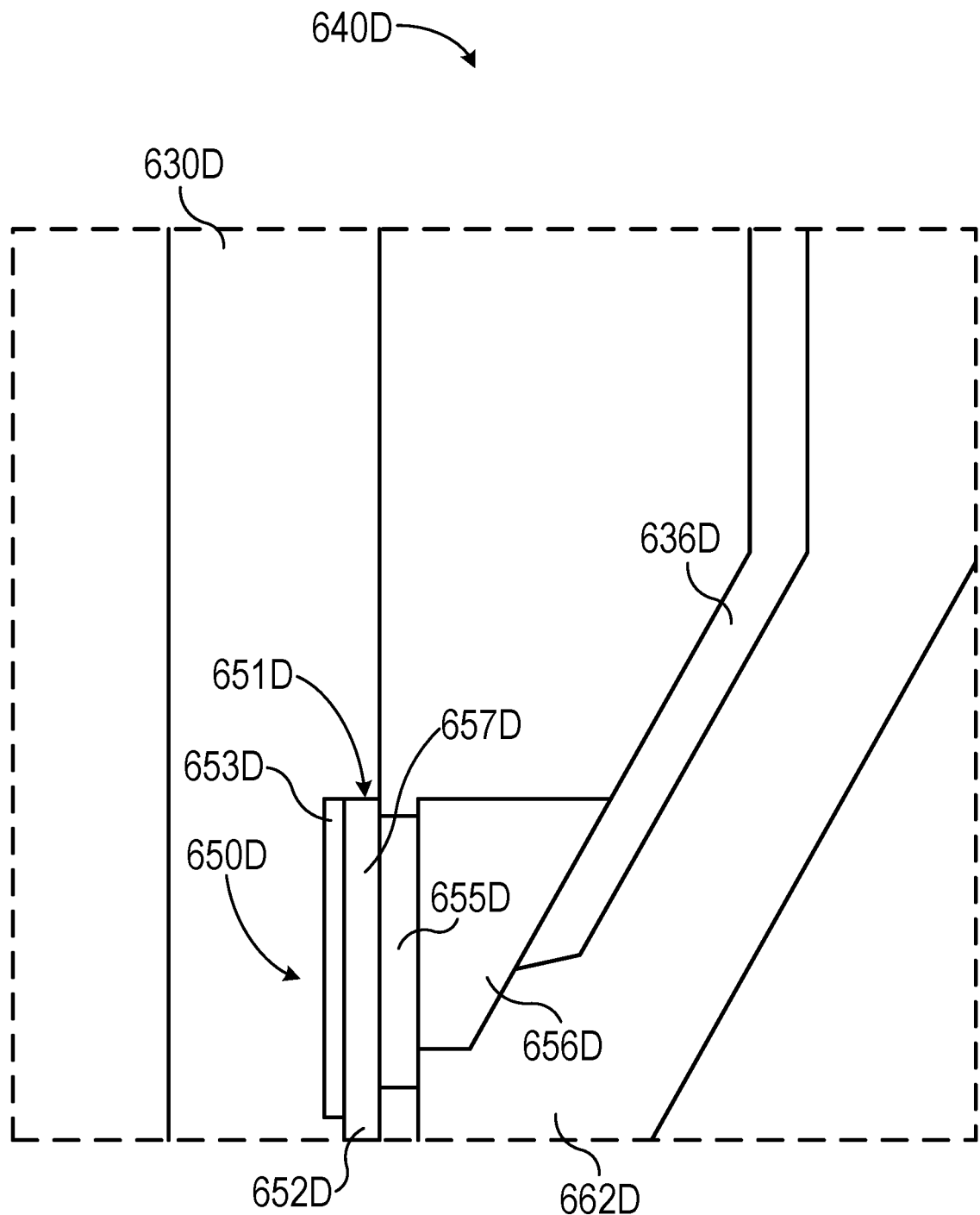
FIG. 6D is a cross-sectional view of an example HAMR head, in accordance with aspects of this disclosure.

Heat-assisted magnetic recording heads 640A, 640B, 640C, and 640D of FIGS. 6A, 6B, 6C, and 6D, respectively, each include a waveguide (630A, 630B, 630C, and 630D), a diffuser (636A, 636B, 636C, and 636D), a heat sink disk (HDSCs 656A, 656B, 656C, and 656D), a write pole (662A, 662B, 662C, and 662D), and an NFT (650A, 650B, 650C, and 650D). NFTs 650A, 650B, 650C, and 650D of these examples include example disks which are configured to support one or more LSP modes (e.g., a transverse electric (TE) mode) generated by coupling between free electrons of the respective disk to incident photons generated by a light source (e.g., laser 226 of FIG. 2) and delivered to the NFT by its respective waveguide. For example, a DSC 654A of FIG. 6A may be structured to support a transverse electric octupole LSP mode (e.g., TE10) and consolidate an LSP distribution at a particular location or area of DSC 654A. NFT 650B of FIG. 6B includes a bottom disk (BDSC) 654B which is proximal to waveguide 630B. NFT 650C of FIG. 6C includes a sunken disk (SDSC) 653C which is proximal to waveguide 630C. NFT 650D of FIG. 6D includes an SDSC 653D, an MDSC 655D, and a near-field emitter 651D. Near-field emitter 651D includes a PEG 652D and a peg anchor 657D. DSC 654A of FIG. 6A, BDSC 654B of FIG. 6B, SDSC 653C of FIG. 6C, and SDSC 653D of FIG. 6D are configured generate and support an LSP distribution through coupling of free electrons to incident photons which are delivered by a waveguide (e.g., waveguide 630A of FIG. 6A, waveguide 630B of FIG. 6B, waveguide 630C of FIG. 6C, waveguide 630D of FIG. 6D) from a light source (e.g., laser 226 of FIG. 2).

Disks of an NFT which are configured for LSP generation and maintenance may include materials (i.e., plasmonic metals), dimensions, and geometries to support the generation of LSPs of a specific resonance mode or modes and transfer or condense an LSP distribution on a particular area of the DSC and/or another feature of the NFT, such as on a peg (e.g., PEG 652A of FIG. 6A, PEG 652B of FIG. 6B, PEG 652C of FIG. 6C, PEG 652D of FIG. 6D). A peg of a respective NFT is configured to focus near-field energy of an LSP distribution and direct it toward an area external to the HAMR head, such as on a surface of a magnetic disk. Example pegs include materials and dimensions which may promote the localization of generated LSPs and the focus of near-field energy of the LSP distribution on an area external to the recording head. In this way, the near-field energy which is focused on an area external to the recording head is a product of resonant amplification (e.g., generation of an LSP distribution from resonant coupling of free electrons of a disk to incident photons from a light source) and non-resonant amplification (e.g., enhancement of the near-field by localization of the LSP distribution on the peg).

Other disks and features of the example HAMR heads and NFTs of FIGS. 6A, 6B, and 6C are configured to support NFT functions such as promoting LSP generation (e.g., through improving photon-electron coupling efficiency, through reducing scattering of incident light from a light source), focusing LSP distributions, focusing near-field energy, managing and dissipating generated heat, reducing operating temperature(s) of the HAMR head features, and reducing laser power requirement. Middle disk (MDSC) 655B of FIG. 6B and MDSC 655C of FIG. 6C, for example, may assist with directing LSPs toward a respective PEG and mitigate background fields. Sunken disk (SDSC) 653B of FIG. 6B may, in some scenarios, reduce temperature and laser power. Peg anchor 657C of FIG. 6C and/or peg anchor 657D of FIG. 6D may support the direction of LSPs toward PEG 652C and/or PEG 652D, respectively. Bottom clad reflector (BCR) 658C of FIG. 6C is configured to redirect scattered photons toward NFT 650C, and in some examples improves coupling efficiency of the photons with NFT 650C and reduces the laser power requirement.

Disks (e.g., DSC, MDSC, SDSC, HDSC), PEGs, and other features (e.g., BCR) of the preceding example HAMR heads of FIGS. 6A, 6B, 6C, and 6D may be prone to thermal degradation which results from thermal exposure during operation. For example, photons received by LSP-generating DSCs such as DSC 654A, BDSC 654B, and SDSCs 653C and 653D which are not converted to LSPs through coupling to free electrons of the respective disks may generate heat through non-radiative mechanisms such as scattering. In other examples, LSPs decay non-radiatively such as through the generation of phonons or hot electrons. Hot electrons may, in some instances, be scattered or act as scattering centers to other electrons. Additionally, a condensed distribution of LSPs on a disk proximal to a peg or on the peg itself (e.g., PEG 652A of FIG. 6A, PEG 652B of FIG. 6B, PEG 652C of FIG. 6C, PEG 652D of FIG. 6D) may be a source of heat. Excess heat generated in NFTs which is dissipated by an HDSC of the respective HAMR head (e.g., HDSC 656A of FIG. 6A, HDSC 656B of FIG. 6B, HDSC 656C of FIG. 6C, HDSC 656D of FIG. 6D) may result in defects in the respective HDSC, such as voids, deformation, and delamination from other features of the respective NFT. Repeated and prolonged thermal exposure of the disks, pegs, and other features of the example HAMR heads of FIGS. 6A, 6B, 6C, and/or 6D may, in some instances, result in defect initiation, growth, and/or migration, which may reduce performance of the HAMR head and/or reduce the lifetime of HAMR head.

In some examples, disks, pegs, peg anchors, and/or BCRs of the example HAMR heads of FIGS. 6A, 6B, 6C, and/or 6D include thermally-stabilized plasmonic alloys. In some examples, a peg includes a thermally-stabilized plasmonic alloy. In some examples, one or more disks (e.g., a DSC, a MDSC, a SDSC, and/or a HDSC) and a peg of an NFT include thermally-stabilized plasmonic alloys. In the example of HAMR head 640C of FIG. 6C, one or more disks (SDSC 653C, MDSC 655C, HDSC 656C), PEG 652C, peg anchor 657C, and/or BCR 658C includes a thermally-stabilized plasmonic alloy. In the example of HAMR head 640D of FIG. 6D, one or more disks (SDSC 653D, MDSC 655D, HDSC 656D) and/or near-field emitter 651D (i.e., PEG 652D and peg anchor 657D) include a thermally-stabilized plasmonic alloy. The inclusion of a thermally-stabilized plasmonic alloy in these example features may improve the thermal stability and/or extend the lifetime of the respective HAMR head. Improvements provided by the thermally-stabilized plasmonic alloy may include the impedance of grain boundary migration and/or increased grain stability under thermal stress.

Different features of a HAMR head may include the same thermally-stabilized plasmonic alloy in multiple features, or may include different thermally-stabilized plasmonic alloys in different features. Using different thermally-stabilized plasmonic alloy for different features of an NFT (e.g., NFTs 650A, 650B, 650C, and 650D of FIGS. 6A, 6B, 6C, and 6D, respectively) may provide the flexibility to tune the properties and composition of the thermally-stabilized plasmonic alloys to address the defects and modes of degradation to which their respective features are most susceptible.

In one example, a disk of a HAMR head (e.g., DSC 654A of FIG. 6A, MDSC 655B of FIG. 6B, HDSC 656C of FIG. 6C) may include a first thermally-stabilized plasmonic alloy and a peg of the respective HAMR head may include the first thermally-stabilized plasmonic alloy or a second, different thermally-stabilized plasmonic alloy. In another example, a first disk of a HAMR head (e.g., SDSC 653B of NFT 650B of FIG. 6B) includes a first thermally-stabilized plasmonic alloy and a second disk of the HAMR head (e.g., MDSC 655B or HDSC 656B of NFT 650B of FIG. 6B) includes the first thermally-stabilized plasmonic alloy or a second, different thermally-stabilized plasmonic alloy.

Different features of a HAMR head may include different thermally-stabilized plasmonic alloys which have different concentrations of an alloying metal. In one example, DSC 654A of NFT 650A includes a first thermally-stabilized plasmonic alloy which includes an alloying metal at a first concentration, and PEG 652A of the same NFT 650A includes a second thermally-stabilized plasmonic alloy which includes an alloying metal at the same first concentration or at a second, different concentration.

In some examples, different features of a HAMR head include thermally-stabilized plasmonic alloy with different alloying metals. For example, an HDSC may include a first thermally-stabilized plasmonic alloy which includes a first alloying metal, and a BDSC or a SDSC may include a second thermally-stabilized plasmonic alloy which includes a second alloying metal. In another example, a peg may benefit from a having a different alloying metal and/or a different concentration of an alloying metal than a peg anchor or disk of the same HAMR head.

FIGS. 7A-7D are perspective views of example HAMR heads, in accordance with aspects of this disclosure. Each HAMR head (740A, 740B, 740C, and 740D) includes a waveguide (730A, 730B, 730C, and 730D), a cladding layer (731A, 731B, 731C, and 731D), and an NFT (750A, 750B, 750C, and 750D). Each NFT includes a peg (PEGs 752A, 752B, 752C, and 752D) and at least one disk. NFT 750A includes a DSC 754A. NFT 750B includes a DSC 753B and a DSC 754B. NFT 750C includes a DSC 753C and a DSC 754C. NFT 750D includes a DSC 753D, a DSC 754D, and a DSC 755D. Disks and pegs of these example HAMR heads may include thermally-stabilized plasmonic alloys.

Disks of NFTs 750A, 750B, 750C, and 750D which include a thermally-stabilized plasmonic alloy may directly contact optical layers of their respective HAMR head without the need for an adhesion layer disposed between the disk and the optical layer. That is, an example HAMR head includes a disk comprising a thermally-stabilized plasmonic alloy, and an optical layer having an NFT-facing surface, wherein the disk has an optical layer-facing surface, wherein the optical layer-facing surface of the disk comprises the thermally-stabilized plasmonic alloy, and wherein the optical layer-facing surface of the disk directly contacts the NFT-facing surface of the optical layer. DSC 754A of NFT 750A includes a waveguide-facing surface 774A which may comprise a thermally-stabilized plasmonic alloy and may be directly coupled to an NFT-facing surface 770A of waveguide 730A. DSC 753B of NFT 750B includes a waveguide-facing surface 773B which may comprise a thermally-stabilized plasmonic alloy and may be directly coupled to an NFT-facing surface 770B of waveguide 730B. DSC 753C and DSC 754C of NFT 750C include waveguide-facing surfaces 773C and 774C, respectively. One or both of waveguide-facing surfaces 773C and 774C may comprise a thermally-stabilized plasmonic alloy and may be directly coupled to an NFT-facing surface 770C of waveguide 730C. DSC 753D and DSC 754D of NFT 750D include waveguide-facing surfaces 773D and 774D, respectively. One or both of waveguide-facing surfaces 773D and 774D may comprise a thermally-stabilized plasmonic alloy and may be directly coupled to an NFT-facing surface 770D of waveguide 730D. In these examples, providing a disk which comprises a thermally-stabilized plasmonic alloy on an optical layer-facing surface and is directly coupled to an optical layer such as a waveguide may enhance photon-plasmonic mode coupling efficiency, providing a higher plasmonic figure of merit than example HAMR heads which do not include one or more disks which directly contact an optical layer.

In accordance with techniques of this disclosure, a method for making a thermally-stabilized plasmonic alloy feature of an NFT of a HAMR head, wherein the thermally-stabilized plasmonic alloy feature is a disk, comprises the steps of (a) providing a substrate to contain features of the heat-assisted magnetic recording head; (b) supporting the substrate in a deposition chamber; (c) providing, on the substrate, an exposed surface for deposition, wherein the exposed surface for deposition is a surface of a first feature of the heat-assisted magnetic recording head; (d) elevating a temperature of the substrate; and (e) depositing a plasmonic metal and an alloying metal directly onto the exposed surface for deposition to form the thermally-stabilized plasmonic alloy disk.

In some examples, the exposed surface for depositing a disk comprising a thermally-stabilized plasmonic alloy is a surface of an optical layer. In some examples, the optical layer is a waveguide. In the example of HAMR head 740A of FIG. 7A, a method of forming DSC 754A may include providing a substrate to contain features of HAMR head 740A, supporting the substrate on a stage of a deposition chamber, providing NFT-facing surface 770A of waveguide 730A for deposition, elevating a temperature of the substrate, and depositing a plasmonic metal and an alloying metal directly onto NFT-facing surface 770A to form DSC 754A.

Figure 7A:
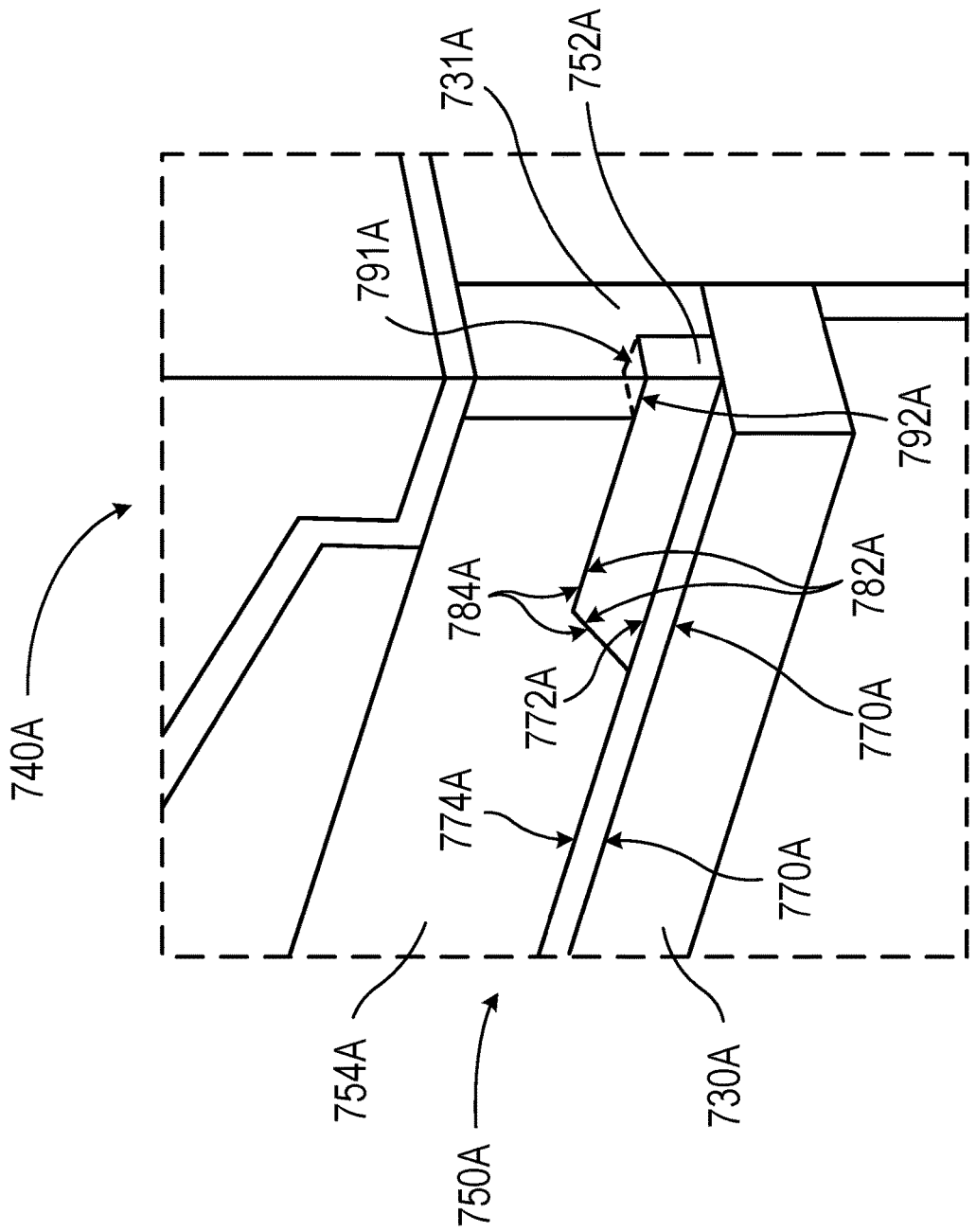
FIG. 7A is a perspective view of an example HAMR head, in accordance with aspects of this disclosure.
Figure 7B:
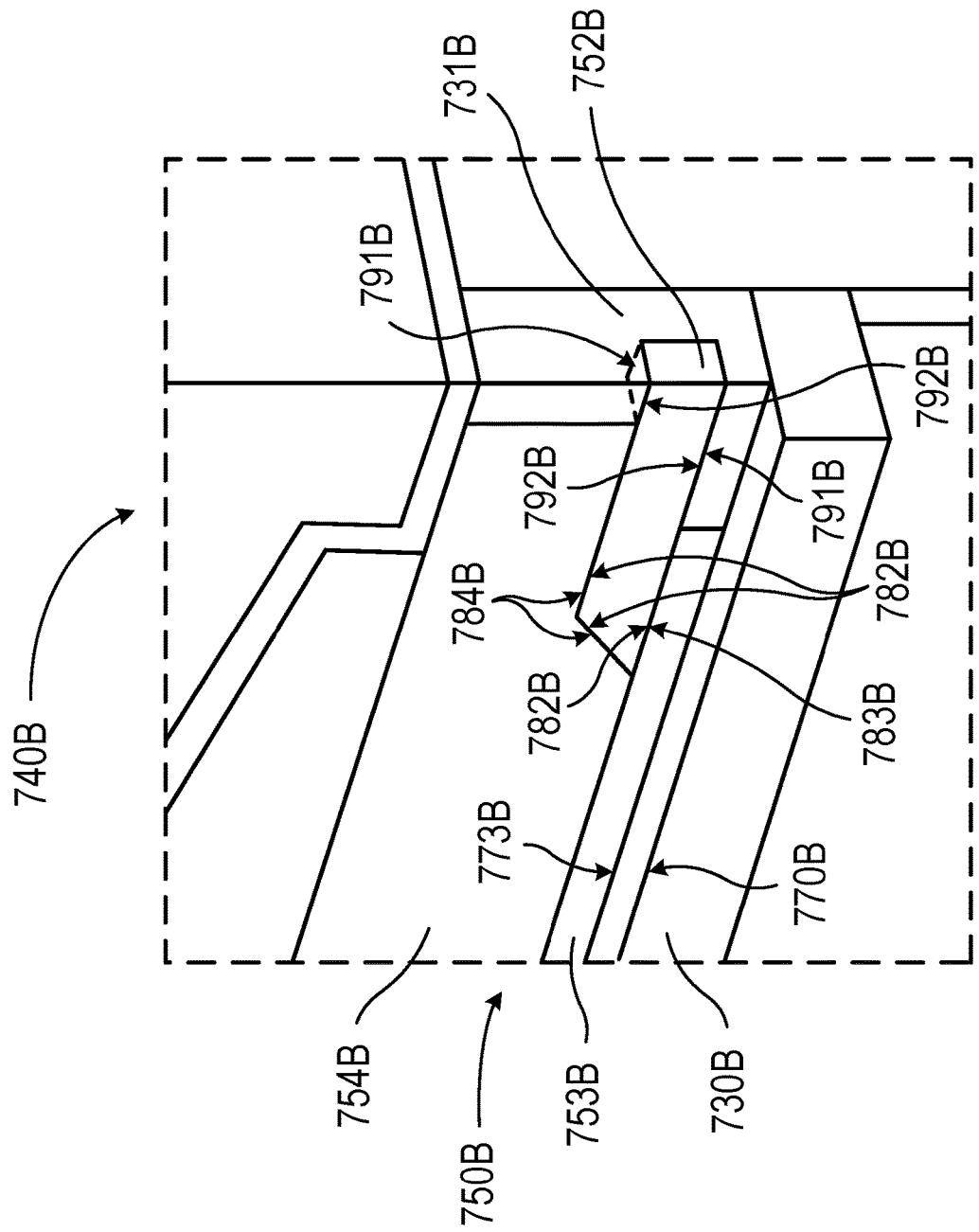
FIG. 7B is a perspective view of an example HAMR head, in accordance with aspects of this disclosure.

In the example of HAMR head 740B of FIG. 7B, a method of forming DSC 753B may include providing a substrate to contain features of HAMR head 740B, supporting the substrate on a stage of a deposition chamber, providing NFT-facing surface 770B of waveguide 730B for deposition, elevating a temperature of the substrate, and depositing a plasmonic metal and an alloying metal directly onto NFT-facing surface 770B to form DSC 753B.

Figure 7C:
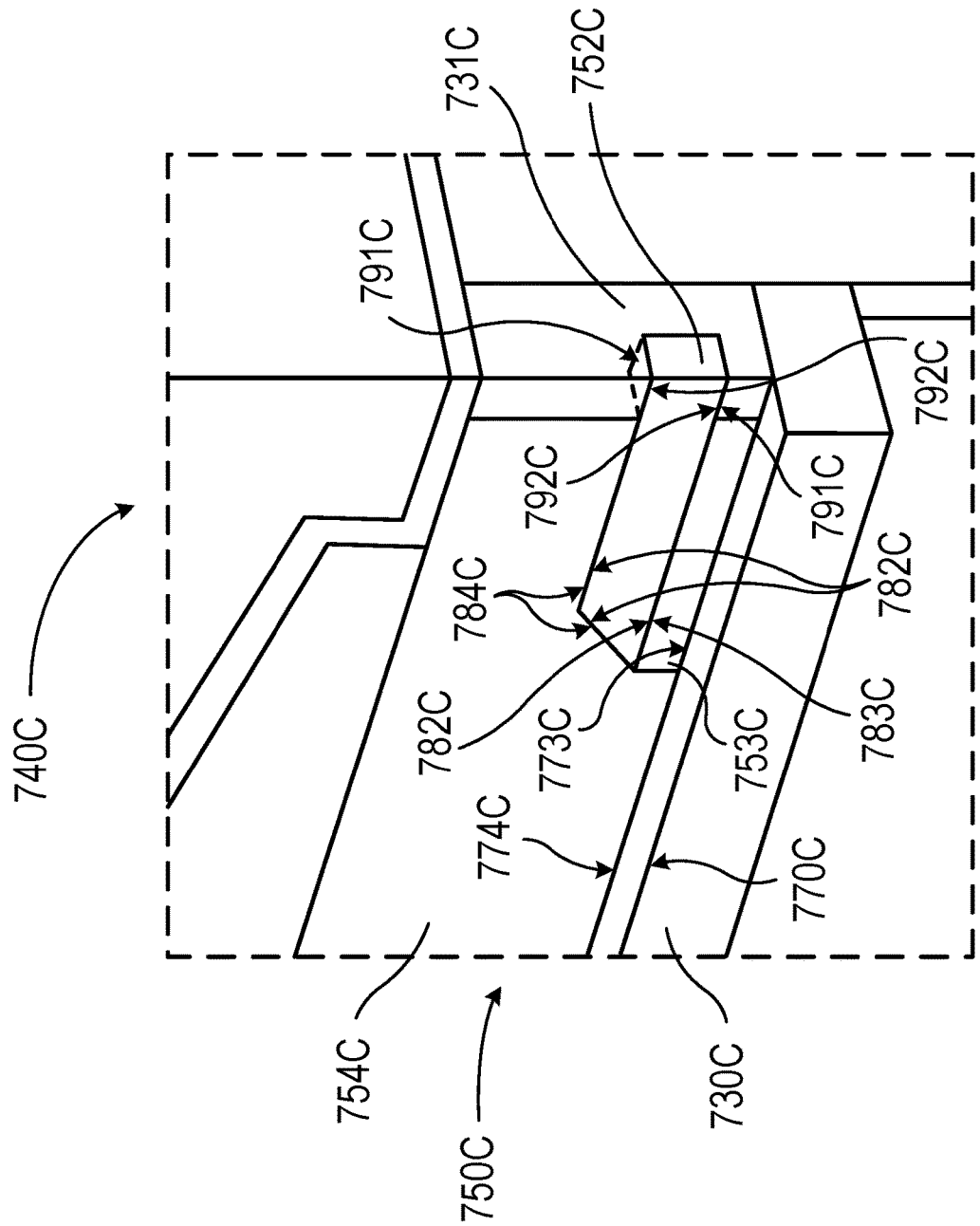
FIG. 7C is a perspective view of an example HAMR head, in accordance with aspects of this disclosure.

In the example of HAMR head 740C of FIG. 7C, a method of forming DSC 753C and/or DSC 754C may include providing a substrate to contain features of HAMR head 740C, supporting the substrate on a stage of a deposition chamber, providing NFT-facing surface 770C of waveguide 730C for deposition, elevating a temperature of the substrate, and depositing a plasmonic metal and an alloying metal directly onto NFT-facing surface 770C to form DSC 753C and/or DSC 754C.

Figure 7D:
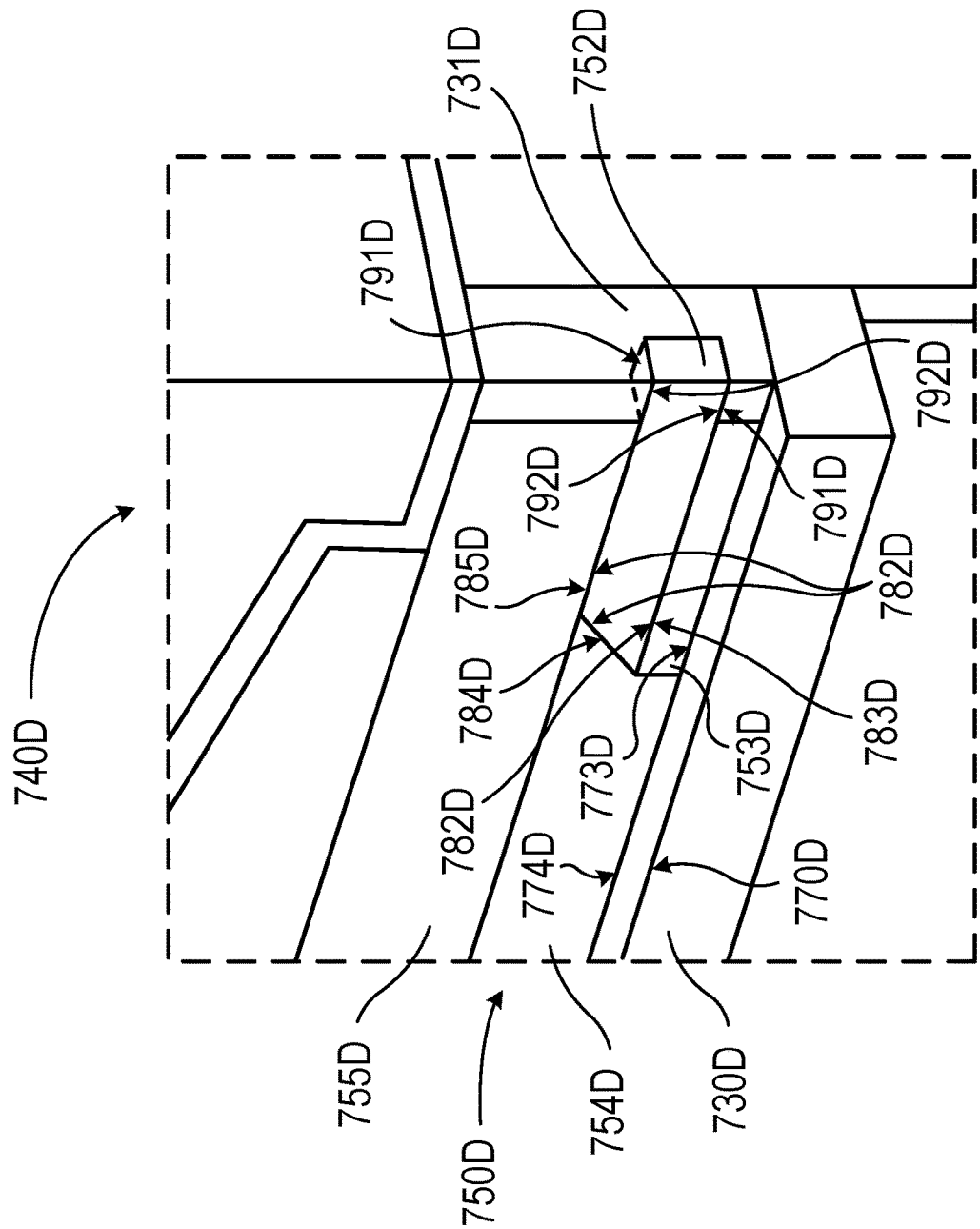
FIG. 7D is a perspective view of an example HAMR head, in accordance with aspects of this disclosure.

In the example of HAMR head 740D of FIG. 7D, a method of forming DSC 753D and/or DSC 754D may include providing a substrate to contain features of HAMR head 740D, supporting the substrate on a stage of a deposition chamber, providing NFT-facing surface 770D of waveguide 730D for deposition, elevating a temperature of the substrate, and depositing a plasmonic metal and an alloying metal directly onto NFT-facing surface 770D to form DSC 753D and/or DSC 754D.

In some examples, the exposed surface for depositing a DSC comprising a thermally-stabilized plasmonic alloy is a surface of a peg. In the example of HAMR head 740A of FIG. 7A, NFT 750A comprises DSC 754A having peg-facing surfaces 784A, and PEG 752A having disk-facing surfaces 782A. In examples where DSC 754A comprises a thermally-stabilized plasmonic alloy, a method of forming DSC 754A may include providing a substrate to contain features of HAMR head 740A, supporting the substrate on a stage of a deposition chamber, providing a disk-facing surface 782A of PEG 752A for deposition, elevating a temperature of the substrate, and depositing a plasmonic metal and an alloying metal directly onto disk-facing surface 782A to form DSC 754A.

In the example of HAMR head 740B of FIG. 7B, NFT 750B comprises DSC 754B having peg-facing surfaces 784B, and PEG 752B having disk-facing surfaces 782B. In examples where DSC 754B comprises a thermally-stabilize plasmonic alloy, a method of forming DSC 754B may include providing a substrate to contain features of HAMR head 740B, supporting the substrate on a stage of a deposition chamber, providing a disk-facing surface 782B of PEG 752B for deposition, elevating a temperature of the substrate, and depositing a plasmonic metal and an alloying metal directly onto disk-facing surface 782B to form DSC 754B.

In the example of HAMR head 740C of FIG. 7C, NFT 750C comprises DSC 754C having peg-facing surfaces 784C, and PEG 752C having disk-facing surfaces 782C. In examples where DSC 754C comprises a thermally-stabilize plasmonic alloy, a method of forming DSC 754C may include providing a substrate to contain features of HAMR head 740C, supporting the substrate on a stage of a deposition chamber, providing a disk-facing surface 782C of PEG 752C for deposition, elevating a temperature of the substrate, and depositing a plasmonic metal and an alloying metal directly onto disk-facing surface 782C to form DSC 754C.

In the example of HAMR head 740D of FIG. 7D, NFT 750D comprises DSC 754D having peg-facing surfaces 784D, DSC 755D having peg-facing surfaces 785D, and PEG 752D having disk-facing surfaces 782D. In examples where DSC 754D and/or DSC 755D comprises a thermally-stabilize plasmonic alloy, a method of forming DSC 754D or DSC 755D may include providing a substrate to contain features of HAMR head 740D, supporting the substrate on a stage of a deposition chamber, providing disk-facing surface(s) 782D of PEG 752D for deposition, elevating a temperature of the substrate, and depositing a plasmonic metal and an alloying metal directly onto disk-facing surface(s) 782D to form DSC 754D or DSC 755D.

The inclusion of a thermally-stabilized plasmonic alloy in a peg of an NFT (e.g., PEGs 752A, 752B, 752C, and 752D) may stabilize the structure of the peg and may reduce or prevent recession of the peg and/or diffusion of the peg material into surrounding features. This may enable the peg to directly contact surrounding features of its respective HAMR head without the need for a diffusion barrier disposed between the peg and these features. Direct contact between a peg and a feature such as a disk or an optical layer, that is, contact between a peg and another feature without an intervening adhesion layer or diffusion barrier, may improve the efficiency of transfer of an LSP distribution to the peg, and in some instances may reduce the required laser power and operating temperature(s) and extend the lifetime of the HAMR head relative to a comparable HAMR head which includes a diffusion barrier disposed between the peg and one or more surrounding features.

In some examples, a HAMR head includes a peg comprising a thermally-stabilized plasmonic alloy, and an optical layer, the optical layer having an NFT-facing surface, the peg having an optical layer-facing surface, wherein the optical layer-facing surface of the peg comprises the thermally-stabilized plasmonic alloy, and wherein the optical layer-facing surface of the peg directly contacts the NFT-facing surface of the optical layer. For example, PEG 752A of NFT 750A includes a waveguide-facing surface 772A which may comprise a thermally-stabilized plasmonic alloy and may be directly coupled to NFT-facing surface 770A of waveguide 730A.

In some examples, a HAMR head includes a peg comprising a thermally-stabilized plasmonic alloy, and a cladding layer, the cladding layer having a peg-facing surface, the peg having a cladding layer-facing surface, wherein the cladding layer-facing surface of the peg comprises the thermally-stabilized plasmonic alloy, and wherein the cladding layer-facing surface of the peg directly contacts the peg-facing surface of the cladding layer. PEG 752A of NFT 750A includes a cladding layer-facing surface 792A which may comprise a thermally-stabilized plasmonic alloy and may be directly coupled to a peg-facing surface 791A of cladding layer 731A. PEG 752B of NFT 750B includes cladding layer-facing surfaces 792B which may comprise a thermally-stabilized plasmonic alloy and may be directly coupled to peg-facing surfaces 791B of cladding layer 731B. PEG 752C of NFT 750C includes cladding layer-facing surfaces 792C which may comprise a thermally-stabilized plasmonic alloy and may be directly coupled to peg-facing surfaces 791C of cladding layer 731C. PEG 752D of NFT 750D includes cladding layer-facing surfaces 792D which may comprise a thermally-stabilized plasmonic alloy and may be directly coupled to peg-facing surfaces 791D of cladding layer 731D.

In some examples, a HAMR head includes a peg comprising a thermally-stabilized plasmonic alloy, and a disk, the disk having a peg-facing surface, the peg having a disk-facing surface, wherein the disk-facing surface of the peg comprises the thermally-stabilized plasmonic alloy, and wherein the disk-facing surface of the peg directly contacts the peg-facing surface of the disk. In some such examples, the disk that the peg comprising the thermally-stabilize plasmonic alloy directly contacts is a bottom disk (BDSC), sunken disk (SDSC), middle disk (MDSC), or peg anchor. PEG 752A of NFT 750A includes disk-facing surfaces 782A. One of more disk-facing surfaces 782A which comprise a thermally-stabilized plasmonic alloy may directly contact one of peg-facing surfaces 784A of DSC 754A.

NFT 750B includes DSC 753B and DSC 754B, each having peg-facing surfaces (783B and 784B respectively). PEG 752B includes disk-facing surfaces 782B. In an example where PEG 752B comprises a thermally-stabilized plasmonic alloy, disk-facing surfaces 782B which comprise the thermally-stabilized plasmonic alloy may be directly coupled to one or more of the peg-facing surfaces 783B and 784B of DSCs 753B and 754B.

NFT 750C includes DSC 753C and DSC 754C, each having peg-facing surfaces (783C and 784C respectively). PEG 752C includes disk-facing surfaces 782C. In an example where PEG 752C comprises a thermally-stabilized plasmonic alloy, disk-facing surfaces 782C which comprise the thermally-stabilized plasmonic alloy may directly contact one or more of the peg-facing surfaces 783C and 784C of DSCs 753C and 754C.

NFT 750D includes DSC 753D, DSC 754D, and DSC 755D, each having peg-facing surfaces (783D, 784D, and 785D respectively). PEG 752D includes disk-facing surfaces 782D. In an example where PEG 752D comprises a thermally-stabilized plasmonic alloy, disk-facing surfaces 782D which comprise the thermally-stabilized plasmonic alloy may be directly coupled to one or more of the peg-facing surfaces 783D, 784D, and 785D of DSCs 753D, 754D, and 755D, respectively.

In some examples, an NFT may include a peg comprising a thermally-stabilized plasmonic alloy, and one or more disks comprising a thermally-stabilized plasmonic alloy. In some examples, an NFT of a HAMR head comprises a disk and a peg, wherein the peg comprises a first thermally-stabilized plasmonic alloy, and wherein the disk comprises a second thermally-stabilized plasmonic alloy. In one example, a peg comprising a first thermally-stabilized plasmonic alloy has a disk-facing surface comprising the first thermally-stabilized plasmonic alloy, a disk comprising a second thermally-stabilized plasmonic alloy has a peg-facing surface comprising the second thermally-stabilized plasmonic alloy, and the disk-facing surface of the peg directly contacts the peg-facing surface of the disk. For example, PEG 752A of NFT 750A may comprise a first thermally-stabilized plasmonic alloy, and DSC 754A of NFT 750A may comprise a second thermally-stabilized plasmonic alloy. Disk-facing surface(s) 782A of PEG 752A may comprise the first thermally-stabilized plasmonic alloy, and may directly contact a peg-facing surface 784A of DSC 754A, the peg-facing surface 784A comprising the second thermally-stabilized plasmonic alloy.

PEG 752B of NFT 750B may comprise a first thermally-stabilized plasmonic alloy, and DSC 753B and/or DSC 754B of NFT 750B may comprise a second thermally-stabilized plasmonic alloy. Disk-facing surface(s) 782B of PEG 752B may comprise the first thermally-stabilized plasmonic alloy, and may be directly coupled to a peg-facing surface 783B of DSC 753B and/or a peg-facing surface 784B of DSC 754B, the peg-facing surface of coupling comprising the second thermally-stabilized plasmonic alloy.

PEG 752C of NFT 750C may comprise a first thermally-stabilized plasmonic alloy, and DSC 753C and/or DSC 754C of NFT 750C may comprise a second thermally-stabilized plasmonic alloy. Disk-facing surface(s) 782C of PEG 752C may comprise the first thermally-stabilized plasmonic alloy, and may directly contact a peg-facing surface 783C of DSC 753C and/or a peg-facing surface 784C of DSC 754C, the peg-facing surface of contact comprising the second thermally-stabilized plasmonic alloy.

PEG 752D of NFT 750D may comprise a first thermally-stabilized plasmonic alloy, and DSC 753D, DSC 754D, and/or DSC 755D of NFT 750D may comprise a second thermally-stabilized plasmonic alloy. Disk-facing surface(s) 782D of PEG 752D may comprise the first thermally-stabilized plasmonic alloy, and may be directly coupled to a peg-facing surface 783D of DSC 753D, a peg-facing surface 784D of DSC 754D, and/or a peg-facing surface 785D of DSC 755D, the peg-facing surfaces of coupling comprising the second thermally-stabilized plasmonic alloy.

In accordance with techniques of this disclosure, a method for making a thermally-stabilized plasmonic alloy feature of an NFT of a HAMR head, wherein the thermally-stabilized plasmonic alloy feature is a peg, comprises the steps of providing a substrate to contain features of the HAMR head; supporting the substrate on a stage of a deposition chamber; providing, on the substrate, an exposed surface for deposition, wherein the exposed surface for deposition is a surface of a first feature of the HAMR head; elevating a temperature of the substrate, and depositing a plasmonic metal and an alloying metal directly onto the exposed surface for deposition to form the thermally-stabilized plasmonic alloy feature.

In some examples, the exposed surface for depositing a PEG comprising a thermally-stabilized plasmonic alloy is a surface of an optical layer. In some examples, the optical layer is a waveguide. In the example of HAMR head 740A of FIG. 7A, a method of forming PEG 752A may include providing a substrate to contain features of HAMR head 740A, supporting the substrate on a stage of a deposition chamber, providing NFT-facing surface 770A of waveguide 730A for deposition, elevating a temperature of the substrate, and depositing a plasmonic metal and an alloying metal directly onto NFT-facing surface 770A to form PEG 752A.

In some examples, the exposed surface for depositing a peg comprising a thermally-stabilized plasmonic alloy is a surface of a cladding layer. In the example of HAMR head 740B of FIG. 7B, a method of forming PEG 752B may include providing a substrate to contain features of HAMR head 740B, supporting the substrate on a stage of a deposition chamber, providing a peg-facing surface 791B of cladding layer 731B for deposition, elevating a temperature of the substrate, and depositing a plasmonic metal and an alloying metal directly onto peg-facing surface 791B to form PEG 752B.

In the example of HAMR head 740C of FIG. 7C, a method of forming PEG 752C may include providing a substrate to contain features of HAMR head 740C, supporting the substrate on a stage of a deposition chamber, providing a peg-facing surface 791C of cladding layer 731C for deposition, elevating a temperature of the substrate, and depositing a plasmonic metal and an alloying metal directly onto peg-facing surface 791C to form PEG 752C.

In the example of HAMR head 740D of FIG. 7D, a method of forming PEG 752D may include providing a substrate to contain features of HAMR head 740D, supporting the substrate on a stage of a deposition chamber, providing a peg-facing surface 791D of cladding layer 731D for deposition, elevating a temperature of the substrate, and depositing a plasmonic metal and an alloying metal directly onto peg-facing surface 791D to form PEG 752D.

In some examples, the exposed surface for depositing a peg comprising a thermally-stabilized plasmonic alloy is a surface of a disk. In the example of HAMR head 740B of FIG. 7B, a method of forming PEG 752B may include providing a substrate to contain features of HAMR head 740B, supporting the substrate on a stage of a deposition chamber, providing a peg-facing surface 783B of DSC 753B for deposition, elevating a temperature of the substrate, and depositing a plasmonic metal and an alloying metal directly onto peg-facing surface 783B to form PEG 752B.

In the example of HAMR head 740C of FIG. 7C, a method of forming PEG 752C may include providing a substrate to contain features of HAMR head 740C, supporting the substrate on a stage of a deposition chamber, providing a peg-facing surface 783C of DSC 753C for deposition, elevating a temperature of the substrate, and depositing a plasmonic metal and an alloying metal directly onto peg-facing surface 783C to form PEG 752C.

In the example of HAMR head 740D of FIG. 7D, a method of forming PEG 752D may include providing a substrate to contain features of HAMR head 740D, supporting the substrate on a stage of a deposition chamber, providing a peg-facing surface 783D of DSC 753D for deposition, elevating a temperature of the substrate, and depositing a plasmonic metal and an alloying metal directly onto peg-facing surface 783D to form PEG 752D.

In some examples, a method for making a thermally-stabilized plasmonic alloy feature of an NFT of a HAMR head, wherein the thermally-stabilized plasmonic alloy feature is a peg, comprises the steps of providing a substrate to contain features of the HAMR head; supporting the substrate on a stage of a deposition chamber; providing, on the substrate, an exposed surface for deposition, wherein the exposed surface for deposition is a surface of a first feature of the HAMR head; elevating a temperature of the substrate, and depositing a plasmonic metal and an alloying metal directly onto the exposed surface for deposition to form the thermally-stabilized plasmonic alloy feature; and depositing a disk directly onto an exposed surface of the peg, the exposed surface comprising the thermally-stabilized plasmonic alloy.

In the example of HAMR head 740A of FIG. 7A, a method of forming PEG 752A may include providing a substrate to contain features of HAMR head 740A, supporting the substrate on a stage of a deposition chamber, providing NFT-facing surface 770A of waveguide 730A for deposition, elevating a temperature of the substrate, and depositing a plasmonic metal and an alloying metal directly onto NFT-facing surface 770A to form PEG 752A, and depositing DSC 754A directly onto disk-facing surfaces 782A of PEG 752A.

In the example of HAMR head 740B of FIG. 7B, a method of forming PEG 752B may include providing a substrate to contain features of HAMR head 740B, supporting the substrate on a stage of a deposition chamber, providing peg-facing surface 783B of DSC 753B and peg-facing surface 791B of cladding layer 731B for deposition, elevating a temperature of the substrate, and depositing a plasmonic metal and an alloying metal directly onto peg-facing surface 783B and peg-facing surface 791B to form PEG 752B, and depositing DSC 754B directly onto disk-facing surfaces 782B of PEG 752B.

In the example of HAMR head 740C of FIG. 7C, a method of forming PEG 752C may include providing a substrate to contain features of HAMR head 740C, supporting the substrate on a stage of a deposition chamber, providing peg-facing surface 783C of DSC 753C and peg-facing surface 791C of cladding layer 731C for deposition, elevating a temperature of the substrate, and depositing a plasmonic metal and an alloying metal directly onto peg-facing surface 783C and peg-facing surface 791C to form PEG 752C, and depositing DSC 754C directly onto disk-facing surfaces 782C of PEG 752C.

In the example of HAMR head 740D of FIG. 7D, a method of forming PEG 752D may include providing a substrate to contain features of HAMR head 740D, supporting the substrate on a stage of a deposition chamber, providing peg-facing surface 783D of DSC 753D and peg-facing surface 791D of cladding layer 731D for deposition, elevating a temperature of the substrate, and depositing a plasmonic metal and an alloying metal directly onto peg-facing surface 783D and peg-facing surface 791D to form PEG 752D, and depositing DSC 754D and DSC 755D directly onto disk-facing surfaces 782D of PEG 752D.

In some examples, a method for making a thermally-stabilized plasmonic alloy feature of an NFT of a HAMR head, wherein the thermally-stabilized plasmonic alloy feature is a peg, comprises the steps of providing a substrate to contain features of the HAMR head; supporting the substrate on a stage of a deposition chamber; providing, on the substrate, an exposed surface for deposition, wherein the exposed surface for deposition is a surface of a first feature of the HAMR head; elevating a temperature of the substrate, and depositing a plasmonic metal and an alloying metal directly onto the exposed surface for deposition to form the thermally-stabilized plasmonic alloy feature; and depositing a cladding layer directly onto an exposed surface of the peg, the exposed surface comprising the thermally-stabilized plasmonic alloy.

In the example of HAMR head 740A of FIG. 7A, a method of forming PEG 752A may include providing a substrate to contain features of HAMR head 740A, supporting the substrate on a stage of a deposition chamber, providing NFT-facing surface 770A of waveguide 730A for deposition, elevating a temperature of the substrate, and depositing a plasmonic metal and an alloying metal directly onto NFT-facing surface 770A to form PEG 752A, and depositing a cladding layer 731A directly onto cladding layer-facing surface 792A of PEG 752A.

In the example of HAMR head 740B of FIG. 7B, a method of forming PEG 752B may include providing a substrate to contain features of HAMR head 740B, supporting the substrate on a stage of a deposition chamber, providing peg-facing surface 783B of DSC 753B and peg-facing surface 791B of cladding layer 731B for deposition, elevating a temperature of the substrate, and depositing a plasmonic metal and an alloying metal directly onto peg-facing surface 783B and peg-facing surface 791B to form PEG 752B, and depositing a cladding layer 731B directly onto cladding layer-facing surface 792B of PEG 752B.

In the example of HAMR head 740C of FIG. 7C, a method of forming PEG 752C may include providing a substrate to contain features of HAMR head 740C, supporting the substrate on a stage of a deposition chamber, providing peg-facing surface 783C of DSC 753C and peg-facing surface 791C of cladding layer 731C for deposition, elevating a temperature of the substrate, and depositing a plasmonic metal and an alloying metal directly onto peg-facing surface 783C and peg-facing surface 791C to form PEG 752C, and depositing a cladding layer 731C directly onto cladding layer-facing surface 792C of PEG 752C.

In the example of HAMR head 740D of FIG. 7D, a method of forming PEG 752D may include providing a substrate to contain features of HAMR head 740D, supporting the substrate on a stage of a deposition chamber, providing peg-facing surface 783D of DSC 753D and peg-facing surface 791D of cladding layer 731D for deposition, elevating a temperature of the substrate, and depositing a plasmonic metal and an alloying metal directly onto peg-facing surface 783D and peg-facing surface 791D to form PEG 752D, and depositing a cladding layer 731A directly onto cladding layer-facing surface 792D of PEG 752D.

EXAMPLE

Sample thermally-stabilized plasmonic alloys were formed substrates using example methods described. The sample thermally-stabilized plasmonic alloys included gold as the plasmonic metal and nickel as the alloying metal. Compositions of the nickel in the thermally-stabilized plasmonic alloys ranged from 2 at. % to 15 at. %. Characterization was completed on the thermally-stabilized plasmonic alloy samples and a reference plasmonic composite. The reference plasmonic composite comprised gold and dispersed yttrium oxide (YO) nanoparticles. The concentration of the YO nanoparticles in the reference plasmonic composite was 1.5 at. %, characterized by the atomic percentage of the metal component of the nanoparticles (yttrium) in the plasmonic composite.

The prepared thermally-stabilized plasmonic alloys and reference plasmonic composite were characterized for optical properties (refractive index n and extinction coefficient k) and thermal conductivity (TC, W/m-K). Table 1 summarizes the sample type, either AuNi (thermally-stabilized plasmonic alloy) or AuYO (reference plasmonic composite), the measured temperature of the substrate for deposition during deposition of the thermally-stabilized plasmonic alloy ($T_{sub}$), the concentration of the alloying metal in the thermally stabilized plasmonic alloy (% alloy), and the measured optical coefficients (n, k) and thermal conductivity (TC).

The optical and thermal characterization results were used to model the performance of example NFTs comprising thermally-stabilized plasmonic alloys. Modeled outputs included performance metrics related to tracks written (down-track and cross-track thermal gradient), laser power requirement to support a HAMR write operation, and temperature changes of features of a HAMR head under operation. A summary of the modeling results is presented in Table 2 and FIGS. 8-11.

TABLE 1

Summary of optical properties and thermal conductivity measurements of sample thermally-stabilized plasmonic alloys

| Sample Type | $T_{sub}$ (° C.) | % alloy | n | k | TC (W/m-K) |
|---|---|---|---|---|---|
| AuYO (ref.) | — | — | 0.2 | 5.40 | 130.0 |
| AuNi | 210 | 4 | 0.28 | 5.46 | 121.2 |
| | | 6 | 0.34 | 5.43 | 113.2 |
| | | 10 | 0.49 | 5.46 | 78.2 |
| | | 15 | 0.63 | 5.60 | 63.8 |
| | 220 | 4 | 0.31 | 5.46 | 128.8 |

TABLE 2

Summary of modeled NFT performance metrics for example NFTs comprising several PEG and diffusion barrier (DB) configurations.

| NFT Configuration | | | TG (K/nm) | | LP | ΔT | | | |
|---|---|---|---|---|---|---|---|---|---|
| DSC | PEG | DB | DT | CT | (mW) | PEG | HDSC | WP | OSS |
| Au | Rh | — | 11.20 | 10.44 | 2.34 | 192 | 100 | 80 | 109 |
| | Ir/Au/Ir | Ir | 11.33 | 10.31 | 2.26 | 179/151 | 84 | 75 | 105 |

TABLE 2-continued

Summary of modeled NFT performance metrics for example NFTs comprising several PEG and diffusion barrier (DB) configurations.

| NFT Configuration | | | TG (K/nm) | | LP | ΔT | | | |
|---|---|---|---|---|---|---|---|---|---|
| DSC | PEG | DB | DT | CT | (mW) | PEG | HDSC | WP | OSS |
| | AuNi4 | Ir | 11.58 | 10.87 | 1.58 | 83 | 51 | 48 | 71 |
| | AuNi15 | — | 11.64 | 10.54 | 1.50 | 111 | 55 | 46 | 68 |

Table 2 is a summary of modeled NFT performance metrics for example HAMR heads comprising several peg and diffusion barrier (DB) configurations. The NFTs modeled have structures which are similar to NFT 750A of FIG. 7A, comprising a disk (DSC 754A) and a peg (752A). All modeled NFTs included a disk comprising gold. Reference NFTs included a rhodium (Rh) or multilayer iridium/gold/iridium (Ir/Au/Ir) peg. Thermally-stabilized plasmonic alloy pegs included one with a Ni concentration of 4 at. % (AuNi4) and one with a Ni concentration of 15 at. % (AuNi15). The Ir/Au/Ir peg reference NFT and the AuNi4 thermally-stabilized plasmonic alloy peg NFT included an iridium diffusion barrier disposed between the peg and the disk.

Down-track (DT) and cross-track (CT) thermal gradients (TG) are metrics of how rapidly the thermal effects of the near-field decrease away from the spot of focus on a surface of a magnetic disk, and are related to the bit and track density which can be written by a HAMR head. A higher gradient is preferred in order to provide better localization of the near-field and reduce the dimensions of the bits which are written by the field from a write pole during a HAMR write operation. Both modeled NFT configurations which include thermally-stabilized plasmonic alloy pegs demonstrate higher down-track and cross-track thermal gradients than both reference NFT configurations.

Laser power (LP) is a metric of the power required by the NFT to sufficiently lower the coercivity of grains on a surface of a magnetic disk such that bits of data can be written by a field from a write pole during a HAMR write operation. A lower laser power is preferred for power consumption and operating temperatures of features of the HAMR head. Both modeled NFT configurations which include pegs comprising a thermally-stabilized plasmonic alloy demonstrate lower laser power than both reference NFT configurations.

Temperature delta (ΔT) is a metric of the temperature increase of a feature during a HAMR write operation. A lower temperature delta is preferred in order to reduce to formation and propagation of thermally-induced defects in a given feature, and to increase the reliability and extend the lifetime of a HAMR head. Temperature delta was modeled for a peg, a heat-sink disk (HDSC), a write pole (WP), and an optical side shield (OSS) of the example HAMR heads. Both modeled NFT configurations which include pegs comprising a thermally-stabilized plasmonic alloy demonstrate lower temperature delta in all features than both reference NFT configurations.

FIGS. 8-11 provide modeled performance data versus peg length (nm) for example NFTs comprising several peg and disk configurations. Example NFT configurations include a reference configuration comprising a gold/yttrium oxide nanoparticle composite (AuYO) disk and a rhodium peg, and four configurations comprising peg and disk combinations of gold/nickel thermally-stabilized plasmonic alloys (AuNi4 comprising 4 at. % nickel, AuNi15 comprising 15 at. % nickel), a gold/yttrium oxide nanoparticle composite (AuYO), and rhodium. Modeled outputs included performance metrics related to tracks written (write-plus-erase width, down-track thermal gradient), laser power requirement to support a HAMR write operation, and peg temperature under operation.

Figure 8:
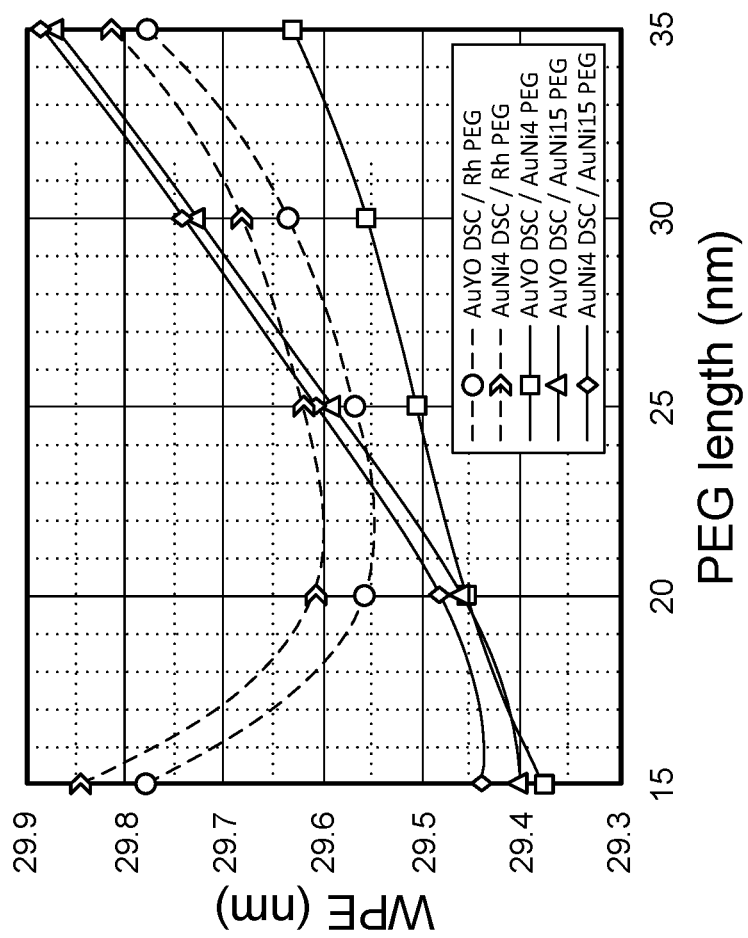
FIG. 8 is a plot of modeled write plus erase (WPE) versus peg length for example peg and disk material configurations.

FIG. 8 is a plot of modeled write plus erase (WPE) versus PEG length for example PEG and DSC material configurations, in accordance with aspects of this disclosure. WPE is a metric which correlates to track pitch, or the density of tracks which can be written onto a surface of a magnetic disk. A narrow WPE enables a higher track pitch, and thus a higher track density and, in some scenarios, higher areal density capability (ADC). FIG. 8 displays a narrower minimum WPE at a shorter PEG length for the NFT configurations which include a peg comprising a thermally-stabilized plasmonic alloy (AuNi4 PEG, AuNi15 PEG). In contrast, the configurations which include a rhodium peg (Rh PEG) demonstrate a minimum WPE which is wider than the minimum demonstrated for the thermally-stabilized plasmonic alloy peg configurations, and which occurs at a longer peg length.

Figure 9:
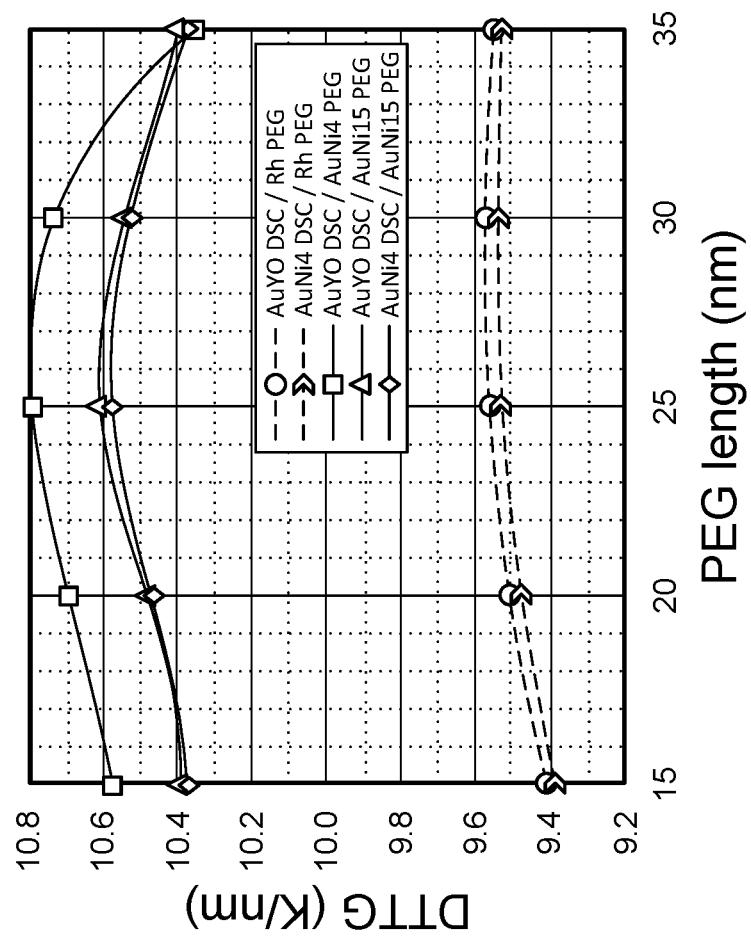
FIG. 9 is a plot of modeled down-track thermal gradient (DTTG) versus peg length for example peg and disk material configurations.

FIG. 9 is a plot of modeled down-track thermal gradient (DTTG) versus peg length for example PEG and DSC material configurations, in accordance with aspects of this disclosure. All NFT configurations which include pegs comprising a thermally-stabilized plasmonic alloy (AuNi4 PEG, AuNi15 PEG) demonstrate higher down-track thermal gradient than the reference NFT configurations which include rhodium pegs (Rh PEG) for all peg lengths which were simulated.

Figure 10:
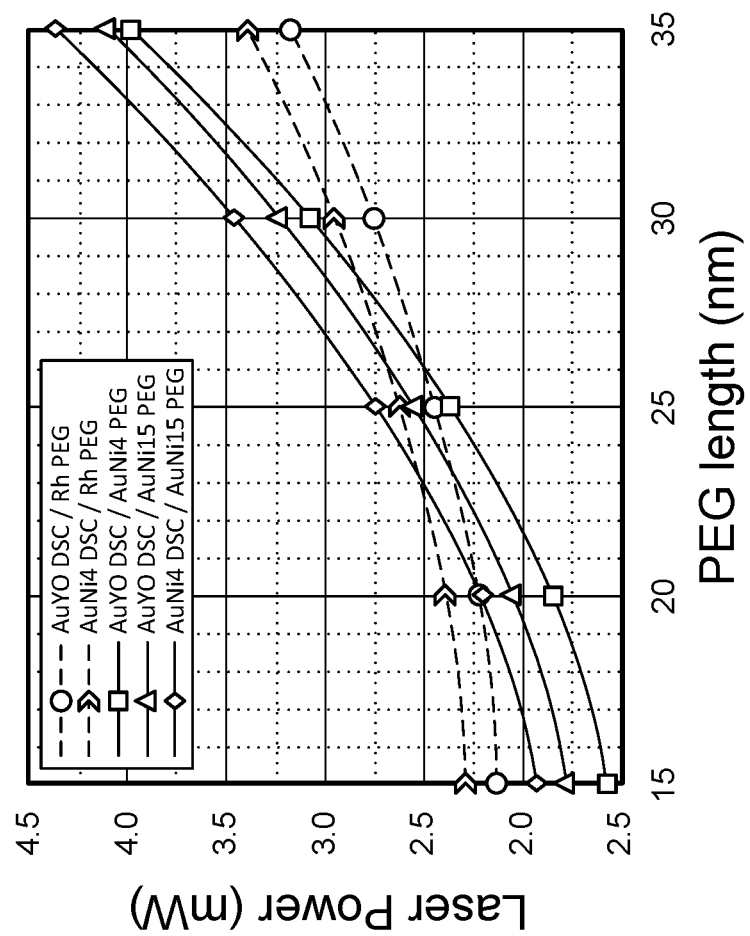
FIG. 10 is a plot of modeled laser power versus peg length for example peg and disk material configurations.

FIG. 10 is a plot of modeled laser power versus PEG length for example PEG and DSC material configurations, in accordance with aspects of this disclosure. All NFT configurations which include pegs comprising a thermally-stabilized plasmonic alloy (AuNi4 PEG, AuNi15 PEG) demonstrate lower laser power requirement than the reference NFT configurations which include rhodium pegs (Rh PEG) for peg lengths of 20 nm or less.

Figure 11:
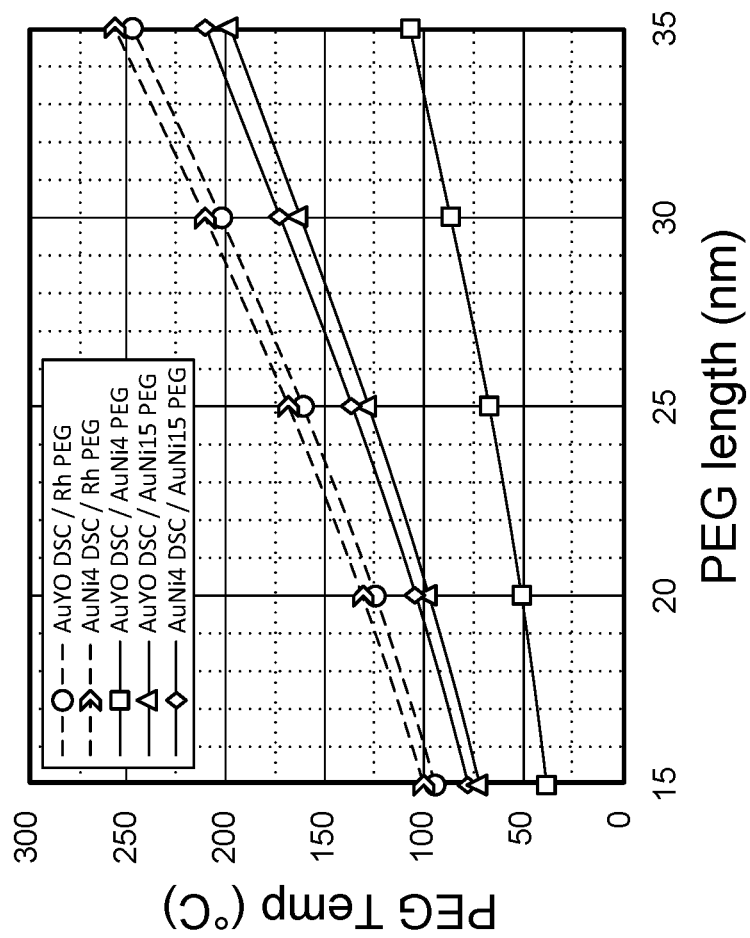
FIG. 11 is a plot of modeled peg temperature versus peg length for example peg and disk material configurations.

FIG. 11 is a plot of modeled PEG temperature versus PEG length for example PEG and DSC material configurations, in accordance with aspects of this disclosure. All NFT configurations which include pegs comprising a thermally-stabilized plasmonic alloy (AuNi4 PEG, AuNi15 PEG) demonstrate lower peg temperature than the reference NFT configurations which include rhodium pegs (Rh PEG) for all peg lengths which were simulated.

Various examples have been presented for the purposes of illustration and description. These and other examples are within the scope of the following claims.

What is claimed is:

1. A heat-assisted magnetic recording head comprising:
    a near-field transducer comprising a thermally-stabilized plasmonic alloy;
    wherein the thermally-stabilized plasmonic alloy comprises:
        a plasmonic metal; and
        at least one alloying metal,
            wherein a concentration of the alloying metal in the thermally-stabilized plasmonic alloy is up to about 20 atomic percent.

2. The heat-assisted magnetic recording head of claim 1, wherein the heat-assisted magnetic recording head further comprises an optical layer having a near-field transducer-facing surface, wherein the near-field transducer has an optical layer-facing surface,
wherein the optical layer-facing surface of the near-field transducer comprises the thermally-stabilized plasmonic alloy, and
wherein the optical layer-facing surface of the near-field transducer directly contacts the near-field transducer-facing surface of the optical layer.

3. The heat-assisted magnetic recording head of claim 1, wherein the near-field transducer comprises a disk, and
wherein the disk comprises the thermally-stabilized plasmonic alloy.

4. The heat-assisted magnetic recording head of claim 3, wherein the heat-assisted magnetic recording head further comprises an optical layer having a near-field transducer-facing surface,
wherein the disk has an optical layer-facing surface,
wherein the optical layer-facing surface of the disk comprises the thermally-stabilized plasmonic alloy, and
wherein the optical layer-facing surface of the disk directly contacts the near-field transducer-facing surface of the optical layer.

5. The heat-assisted magnetic recording head of claim 1, wherein the near-field transducer comprises a peg, and
wherein the peg comprises the thermally-stabilized plasmonic alloy.

6. The heat-assisted magnetic recording head of claim 5, wherein the heat-assisted magnetic recording head further comprises an optical layer having a near-field transducer-facing surface,
wherein the peg has an optical layer-facing surface comprising the thermally-stabilized plasmonic alloy, and
wherein the optical layer-facing surface of the peg directly contacts the near-field transducer-facing surface of the optical layer.

7. The heat-assisted magnetic recording head of claim 5, wherein the near-field transducer comprises a disk having a peg-facing surface,
wherein the peg has a disk-facing surface comprising the thermally-stabilized plasmonic alloy, and
wherein the disk-facing surface of the peg directly contacts the peg-facing surface of the disk.

8. The heat-assisted magnetic recording head of claim 7, wherein the disk is
a bottom disk,
a sunken disk,
a middle disk, or
a peg anchor.

9. The heat-assisted magnetic recording head of claim 5, wherein the heat-assisted magnetic recording head further comprises a cladding layer having a peg-facing surface,
wherein the peg has a cladding layer-facing surface comprising the thermally-stabilized plasmonic alloy, and
wherein the cladding layer-facing surface of the peg directly contacts the peg-facing surface of the cladding layer.

10. The heat-assisted magnetic recording head of claim 1, wherein the near-field transducer comprises:
a disk; and
a peg,
wherein the peg comprises a first thermally-stabilized plasmonic alloy, and
wherein the disk comprises a second thermally-stabilized plasmonic alloy.

11. The heat-assisted magnetic recording head of claim 10,
wherein the peg has a disk-facing surface comprising the first thermally-stabilized plasmonic alloy,
wherein the disk has a peg-facing surface comprising the second thermally-stabilized plasmonic alloy, and
wherein the disk-facing surface of the peg directly contacts the peg-facing surface of the disk.

12. The heat-assisted magnetic recording head of claim 10, wherein a concentration of the at least one alloying metal in the first thermally-stabilized plasmonic alloy is from about 6 atomic percent to about 20 atomic percent.

13. The heat-assisted magnetic recording head of claim 10, wherein a concentration of the at least one alloying metal in the second thermally-stabilized plasmonic alloy is up to about 6 atomic percent.

14. The heat-assisted magnetic recording head of claim 1, wherein the plasmonic metal comprises gold, silver, ruthenium, copper, aluminum, rhodium, and combinations thereof.

15. The heat-assisted magnetic recording head of claim 1, wherein the plasmonic metal comprises gold.

16. The heat-assisted magnetic recording head of claim 1, wherein the at least one alloying metal comprises nickel (Ni), bismuth (Bi), indium (In), tin (Sn), manganese (Mn), holmium (Ho), lutetium (Lu), praseodymium (Pr), scandium (Sc), uranium (U), barium (Ba), cesium (Cs), dysprosium (Dy), europium (Eu), rubidium (Rb), terbium (Tb), gadolinium (Gd), samarium (Sm), thallium (Tl), cadmium (Cd), neodymium (Nd), lead (Pb), hafnium (Hf), niobium (Nb), erbium (Er), zinc (Zn), magnesium (Mg), palladium (Pd), vanadium (V), chromium (Cr), iron (Fe), lithium (Li), platinum (Pt), sodium (Na), strontium (Sr), calcium (Ca), yttrium (Y), thorium (Th), beryllium (Be), thulium (Tm), erbium (Er), ytterbium (Yb), promethium (Pm), neodymium (Nd), cobalt (Co), cerium (Ce), lanthanum (La), praseodymium (Pr), or combinations thereof.

17. The heat-assisted magnetic recording head of claim 1, wherein the at least one alloying metal comprises nickel.

* * * * *